US008295555B2

(12) United States Patent
Campbell, Jr. et al.

(10) Patent No.: US 8,295,555 B2
(45) Date of Patent: Oct. 23, 2012

(54) SYSTEMS AND METHODS FOR PROCESSING OF COVERINGS SUCH AS LEATHER HIDES AND FABRICS FOR FURNITURE AND OTHER PRODUCTS

(75) Inventors: Robert L. Campbell, Jr., Hickory, NC (US); Charles A. Leonard, Hickory, NC (US); Robert L. Miller, Grass Valley, CA (US)

(73) Assignee: Automated Vision, LLC, Sawmills, NC (US)

( * ) Notice: Subject to any disclaimer, the term of this patent is extended or adjusted under 35 U.S.C. 154(b) by 273 days.

(21) Appl. No.: 12/780,646

(22) Filed: May 14, 2010

(65) Prior Publication Data
US 2011/0280449 A1 Nov. 17, 2011

(51) Int. Cl.
*G06K 9/00* (2006.01)
(52) U.S. Cl. .......................... 382/111; 353/28; 353/121
(58) Field of Classification Search .................. 382/100, 382/111, 199; 353/28, 121
See application file for complete search history.

(56) References Cited

U.S. PATENT DOCUMENTS

| 4,124,285 A | * | 11/1978 | Johnson et al. | 353/28 |
| 4,472,545 A | | 9/1984 | Coughlin et al. | |
| 4,941,183 A | * | 7/1990 | Bruder et al. | 382/111 |
| 5,258,917 A | * | 11/1993 | Bruder et al. | 700/171 |
| 5,435,012 A | | 7/1995 | Lincoln | |
| 6,192,777 B1 | * | 2/2001 | Williams et al. | 83/56 |
| 7,097,310 B2 | * | 8/2006 | Perkins et al. | 353/99 |
| 2003/0168900 A1 | | 9/2003 | Poli | |

FOREIGN PATENT DOCUMENTS

JP 09013100 A * 1/1997

OTHER PUBLICATIONS

Notification of Transmittal of the International Search Report and the Written Opinion of the International Searching Authority, or the Declaration for International Application No. PCT/US2011/036416 (Feb. 24, 2012).

* cited by examiner

*Primary Examiner* — Andrew W Johns
*Assistant Examiner* — Shefali Goradia
(74) *Attorney, Agent, or Firm* — J. Bennett Mullinax, LLC

(57) ABSTRACT

Methods and systems for processing coverings such as leather hides and fabrics are provided. A system can include a worktable having a surface on which a covering is placeable. An imaging device can be positionable relative to the worktable. The imaging device can be configured to obtain an image of the covering on the surface of the worktable. A projector can be positionable relative to worktable. The projector can be configured to project an image onto the surface of the worktable and the covering on the surface of the worktable. A controller can be in communication with the imaging device and projector. The controller can be configured to correct images taken by the imaging device. The controller can also be configured to correct the images projected onto the surface of the worktable and the covering thereon. The controller can be configured to permit the showing of virtual markings on the covering placed on the surface of the worktable through an image projected thereon by the projector. The covering can then be marked or cut along the virtual markings.

41 Claims, 18 Drawing Sheets

SYSTEMS AND METHODS FOR PROCESSING OF COVERINGS SUCH AS LEATHER HIDES AND FABRICS FOR FURNITURE AND OTHER PRODUCTS

TECHNICAL FIELD

The present subject matter relates to systems and methods for the processing of coverings, such as leather hides and fabrics. In particular, the present subject matter relates to systems and methods that can be used to efficiently optimize leather and fabric yield for use in manufacturing of consumer products, such as furniture.

BACKGROUND

Both leather animal hides and fabrics are used throughout the world today in the construction of consumer products. For example, leather and fabrics are popular coverings used in furniture and other consumer products. In today's economy, for furniture manufacturing to be profitable, the yield from leather hides and decorative fabrics used to cover the furniture needs to be optimized.

The popularity of leather is due to its durability, look and feel. Leather hides are also an expensive alternative, usually representing 2 to 4 times the cost of woven goods. Therefore, maximum yield and utilization of the leather hide is essential in controlling the manufacturing cost of products containing leather. This is quite difficult considering the irregularities of the leather hides which vary in both size and shape. Leather is also a natural product containing imperfections that must be taken into consideration when deciding where to cut certain parts for a product.

Both manual and mechanical methods currently exist for the cutting of leather hides while attempting to maximize leather yield.

Typical manual methods include the placement of hard (plastic or cardboard) templates on the leather hide. The leather is then typically marked with chalk, grease pencil, or other writing instruments using the template as a guide. After the entire hide is marked, the leather is then cut using a variety of knives, both powered and non-powered. Alternatively, sometimes the marking of the leather is omitted and the leather is cut using a non-powered rolling knife guided by following the edge of each template. Using these manual methods does not produce optimum leather yield since the manual marker or cutter generally does not attempt to place the templates in very many positions before marking or cutting. Typically, there are millions of feasible placement options for each template on a given leather hide and it is too time consuming to attempt placement at every possible location. It is also impossible to know if the placement of the templates at any given location represents the best yield for that particular leather hide.

Typical mechanical methods include the placement of the leather hide on a table or conveyor belt, which is part of an automated cutting machine. A person using one of two methods then defines imperfections in the leather hide. In some cases the leather hides are marked with a colored tape, chalk or grease pencil. Each color represents a different type of imperfection. Often, markings on the leather hide are difficult or impossible to remove. The glue on pinstripe tape may leave residue on the hide and can damage the appearance of the surface. In other cases, the leather hide is marked digitally using a laser pointer, sonic digitizer or a digitizing tablet underneath the cutting surface on the machine. After defect marking, the leather hide is photographed with a camera. A computer then processes the digitized image and the boundary or perimeter of the hide is determined and represented digitally by a closed polyline. The imperfections are also processed at the same time resulting in digital map of the imperfections and their relationship to the boundary of the leather hide. A computer uses the digitally defined leather hide data to try multiple iterations of digital template placement, taking into consideration imperfection types and locations. This is generally accomplished using various available software systems designed for nesting templates on leather hides. Nesting is usually performed for a specified length of time, for a specified number of iterations, or until a yield threshold has been met or exceeded. Once the nesting is complete, the digital template definitions and locations are converted to a numeric code format that is interpreted by the master control computer on the cutting machine. The machine using this digital data then cuts the leather hide.

While mechanical leather cutting systems of this type represent the best available method for achieving improved leather yields, they are quite expensive and costly to maintain. In addition, leather cutting machines do not represent a significant labor savings and their cost must be justified primarily on leather yield improvements alone.

With regards to decorative fabrics used to cover furniture, some of the same drawbacks apply to the methods of cutting patterns. With fabrics, fully automated pattern optimization and cutting systems are currently available. However, these automated systems are expensive and costly to maintain.

SUMMARY

The present subject matter provides systems and methods for increasing yield and decreasing labor in processing coverings for consumer products. The methods and systems utilize pairs of coordinate transformation tables to correct images captured by a camera and those to be displayed by a projector. The methods and systems then use virtual markings projected on the system work table to define defects and cutting lines. For example, once the covering is placed on the work table, the operator can use a pointing device to move a cursor projected by a coordinate-corrected projector to define any imperfections on the covering using virtual markings. Alternatively, the operator can outline the imperfections using a visible light or infra-red (IR) pen whose position is tracked by a video camera. An image of the covering may then be taken and, after processing to correct for camera distortions, may be used to define the boundaries of the covering. Nesting of templates for cutting or marking patterns can then be performed by a computer taking into account the cover boundaries and the location of the virtual defect markings. Lines defining each template's boundary can then be projected on the covering for the operator to use to mark or cut the templates.

It is an object of the presently disclosed subject matter to provide systems and methods for increasing yield in the processing of coverings for consumer products. An object of the presently disclosed subject matter having been stated hereinabove, and which is achieved in whole or in part by the presently disclosed subject matter, other objects will become evident as the description proceeds when taken in connection with the accompanying drawings as best described hereinbelow.

BRIEF DESCRIPTION OF THE DRAWINGS

A full and enabling disclosure of the present subject matter including the best mode thereof to one of ordinary skill in the art is set forth more particularly in the remainder of the specification, including reference to the accompanying figures, in which.

DETAILED DESCRIPTION

Figure 1:
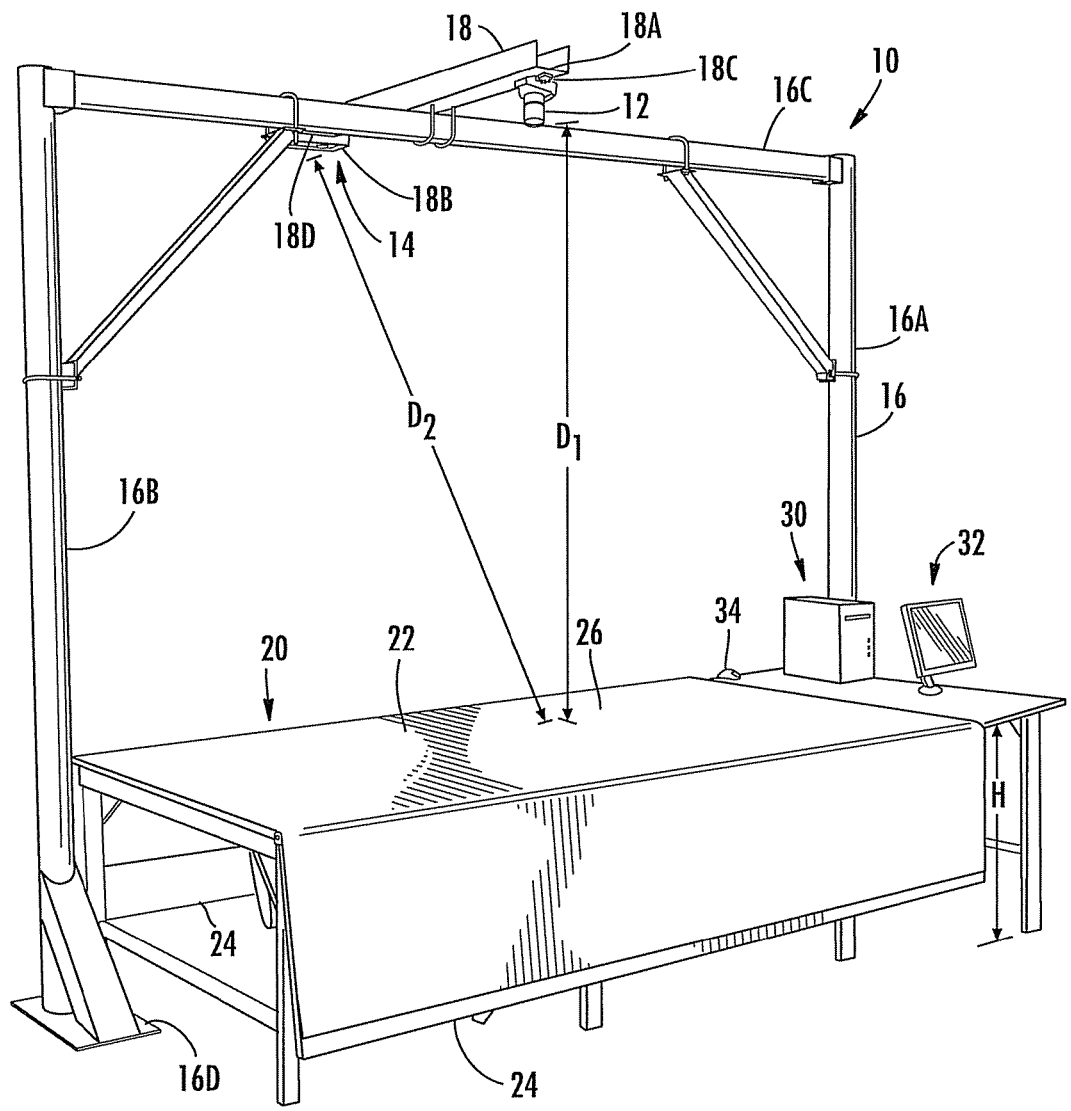
FIG. 1 illustrates a perspective view of an embodiment of a system that can be used in the processing of coverings, such as leather hides and fabrics, according to the present subject matter.

Reference will now be made in detail to the description of the present subject matter, one or more examples of which are shown in the figures. Each example is provided to explain the subject matter and not as a limitation. In fact, features illustrated or described as part of one embodiment can be used in another embodiment to yield still a further embodiment. It is intended that the present subject matter cover such modifications and variations.

"Known subject" as used herein means an object or item, including, but not limited to, maps or patterns, that have features having known dimensional shapes and sizes and known distances between such features that can be used to determine distortions and imperfections in shape, scale and locations in images taken by, for example, a camera or projected by a projector.

"Calibration chart" as used herein means a sheet article having a pattern thereon with the pattern having features, including, but not limited to geometric shapes, having measured and known dimensions and/or having measured and known distances between such features. A calibration chart can be used as a known subject to determine distortions and imperfections in images taken by a camera or projected by a projector.

"Virtual markings" as used herein means computer generated lines and figures displayable on an output of a computer, the lines and figures including but not limited to, lines drawn with a pointing device such as a mouse, templates, patterns, or the like. The virtual markings can be created and displayed in an image projected onto an object or coverings, such as a leather hide or a fabric.

"Coverings" as used herein means generally flat, drapable articles and/or material used to upholster furniture or cover other similar products. Coverings can include but are not limited to leather hides or sheet articles, such as woven fabrics, knitted fabrics, nonwoven fabrics, films or the like.

"Coordinate transformation table" or "coordinate transformation algorithm" as used herein means a table or set of equations used to adjust the coordinates of objects in images captured by an imaging device or coordinates of objects in images projected by a projector to obtain their true locations and dimensions on the surface of the system work table and display them without distortion on the work table surface. The coordinate transformation table or algorithm can be created by a comparison of the dimensions of the known subject to the dimensions of an image of the known subject captured by an imaging device and/or projected by a projector.

"Imaging device" as used herein means any device that is used to capture images. Imaging devices can include, but are not limited to image capture devices such as cameras, digital cameras, video cameras, or the like.

The present subject matter includes systems and methods for processing coverings used in furniture and other products. These systems and methods can use camera images and projected virtual markings to increase the yield of panels cut from coverings such as leather hides, woven fabrics, knitted fabrics, nonwoven fabrics, and the like and can reduce labor costs associated with the processing and creation of such panels.

Generally, a system for processing coverings can be provided that can include a worktable having a surface on which a covering is placeable. The system can also include an imaging device positioned for capturing the image of a covering on the worktable. The imaging device can be configured to obtain an image of the covering on the surface of the worktable. The system can also include a projector for projecting images on the worktable. The projector can be configured to project an image onto the surface of the worktable and the covering on the surface of the worktable. The system can also include a pointing device such as a light pen, IR pen, or the like which can be imaged by the imaging device. The system also can include a controller in communication with the imaging device and projector. The controller can be configured to track the movements of the pointing device such as a light pen or IR pen in the images taken by the imaging device. The controller can be configured to correct images taken by the imaging device of the light pen location, the surface of the worktable and the covering thereon. The controller can also be configured to correct the images projected onto the surface of the worktable and the covering thereon. Further, the controller can be configured to permit the showing of virtual markings on the covering placed on the surface of the worktable through an image projected thereon by the projector.

The controller can also be configured to utilize information provided by additional pointing devices such as a computer mouse to create the virtual markings that can be projected as an image from the projector onto a covering on the surface of the worktable.

The controller can be configured to correct images taken by the imaging device of the surface of the worktable and the covering and any features projected thereon so that the image taken is compensated to take into account imperfections of the image taking process to maximize the dimensional accuracy of the corrected images. Additionally, the controller can be configured to correct images projected by the projector on the surface of the worktable and the covering thereon so that the image projected is compensated to take into account imperfections of the image projecting process to maximize the dimensional accuracy of the corrected projected images.

More particularly, the controller can be configured to correct the images from the camera by a process that includes a process of taking an image of a known subject having known dimensional features by the camera and comparing the known dimensional features of the known subject to the dimensional features of the image to be corrected. For example, the known subject can be a calibration chart. The controller can be configured to correct the images taken by the camera through the use of a first coordinate transformation table created by the comparison of the dimensions of the known subject to the dimensions of the captured image. Further, the controller can be configured to correct the images projected from the projector by a process that includes projecting an image of a known subject having known dimensional features. An image of the projected image can be taken with the imaging device and the known dimensional features of the known subject can be compared to the dimensional features of the projected image to be corrected. The controller can also be configured to correct the images projected by the projector through the use of a second coordinate transformation table created by the comparison of the dimensions of the known subject to the dimensions of the image of the projected image.

The controller used in the subject matter described herein for virtually marking a covering can be implemented using a computer readable medium having stored thereon executable instructions that when executed by the processor of a computer control the processor to perform steps. Exemplary computer readable media suitable for implementing the subject matter described herein includes disk memory devices, programmable logic devices, and application specific integrated circuits. In one implementation, the computer readable medium may comprise a memory accessible by a processor. The memory may comprise instructions executable by the processor for implementing any of the methods for correcting images captured by an imaging device, correcting images projected by a projector, tracking the movements of pointing devices such as a light pen or IR pen in the images taken by an imaging device, or any of the other steps described above or hereinbelow. In addition, a computer readable medium that implements the subject matter described herein may be distributed across multiple physical devices and/or computing platforms.

The following examples illustrate more specific embodiments of the systems and methods of processing coverings. In particular, embodiments that can be used for processing animal hides and fabric are described.

Figure 2:
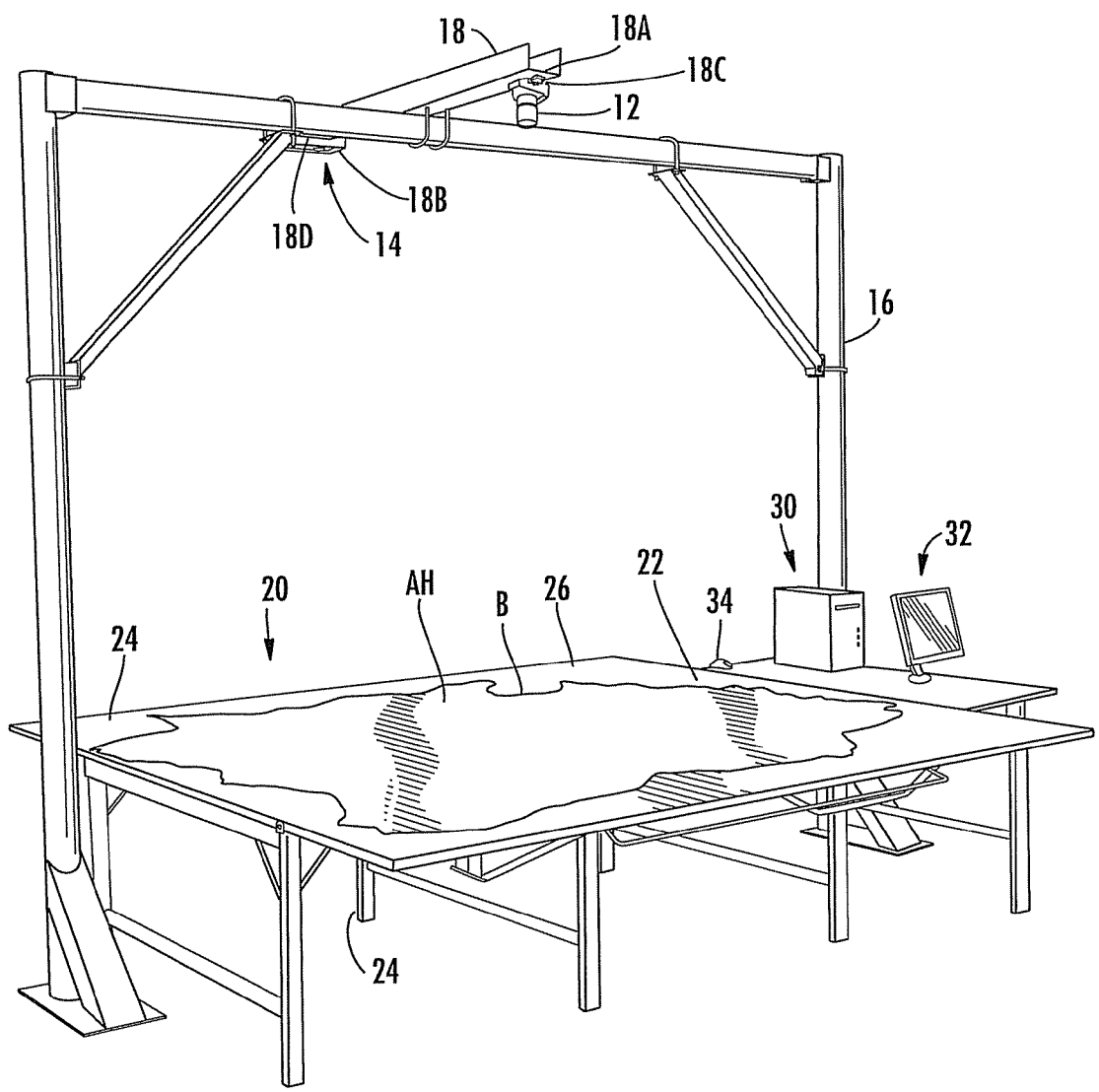
FIG. 2 illustrates a perspective view of the embodiment of the system shown in FIG. 1 with a leather hide on a worktable of the system.

Referring to FIGS. 1 and 2, the present subject matter provides a system, generally designated 10, that employs a method for achieving improvements in leather hide utilization and labor costs. The system 10 can be used to process leather to optimize leather yield. In particular, the system 10 can provide improved yield, time, and labor costs in the cutting of patterns from leather hides. The system 10 can include a worktable 20, an imaging device 12, an image projector 14 and a controller 30.

The worktable 20 can include a center top on which an animal hide AH can be placed. Due to the size of some animal hides, the worktable 20 can be a drop-leaf table that has one or more leafs that are foldable to provide access to the entire animal hide AH. For example, the worktable 20 can have leafs 24 that can be folded downward as shown in FIG. 1 to provide access to the center of a large hide (not shown in FIG. 1) on the center top 22. The leafs 24 can be extended upward to a level position with the center top 22 as shown in FIG. 2 to provide access to the outer portions of the animal hide AH proximal to boundaries B of the animal hide AH. The table top, which comprises the center top 22 and the leafs 24 of the worktable 20, can have a holding mat, for example, that aids in holding the animal hide AH in the same position on the worktable 20 as work is to be perform on the animal hide AH once it is placed on the worktable 20. Further, the worktable 20 can be set at a height H that is ergonomically correct for the intended workers who inspect, mark and cut the animal hides AH. Another example of a means for holding the hide AH to the worktable includes a vacuum table. On such a vacuum table, the means for holding the hide AH can be a vacuum surface of the vacuum table.

The imaging device 12 is used to capture images of objects or coverings placed on the worktable 20, such as the animal hide AH. The imaging device 12 can be a camera. For example, the camera can be a still-photographic or video camera. The camera can provide a digital image or can provide an image that can be digitized. For example, the imaging device 12 can be a digital camera. Hereinbelow, the imaging device 12 will be referred to as camera 12. The camera 12 can be placed at a distance $D_1$ that permits the camera 12 to obtain the image, i.e., photograph, of the entire animal hide AH during use of the system 10.

Figure 3:
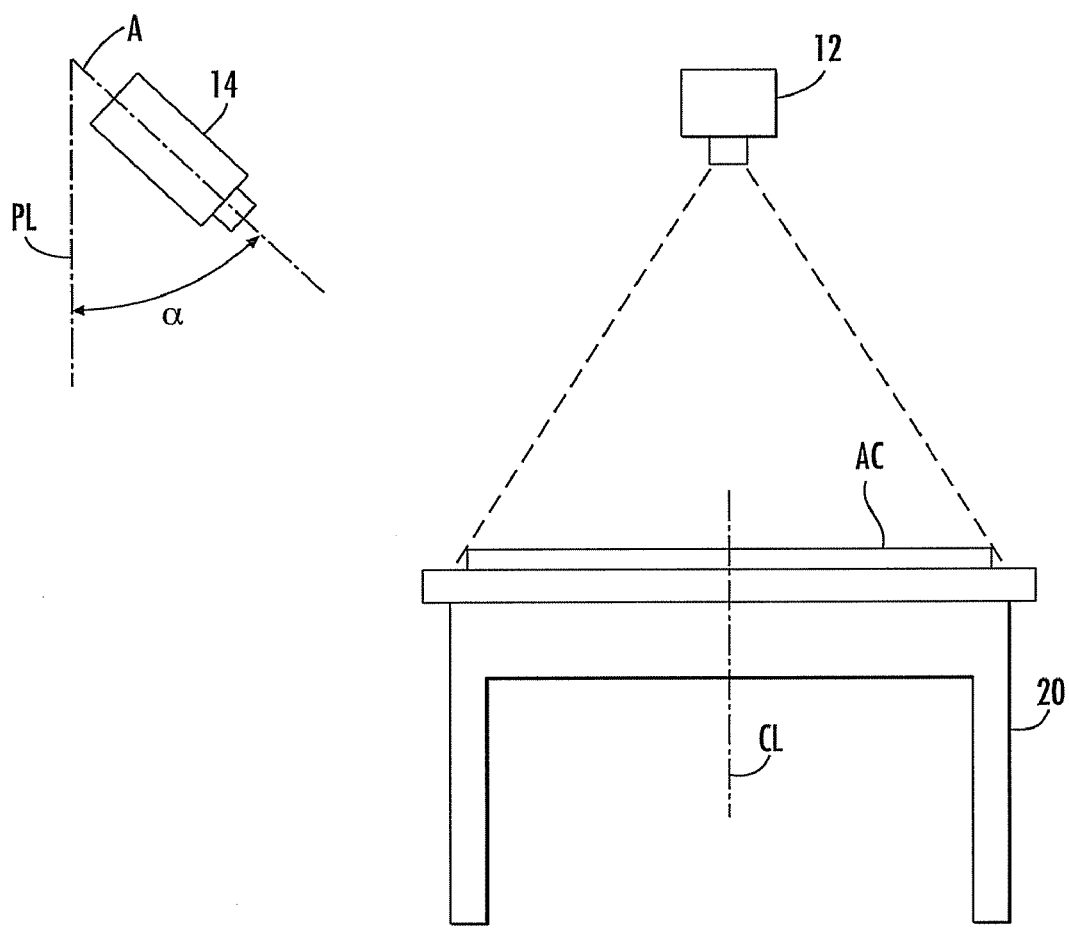
FIG. 3 illustrates a schematic view of an embodiment of a system that can be used to increase yield in the processing of coverings, such as leather hides, according to the present subject matter.
Figure 4:
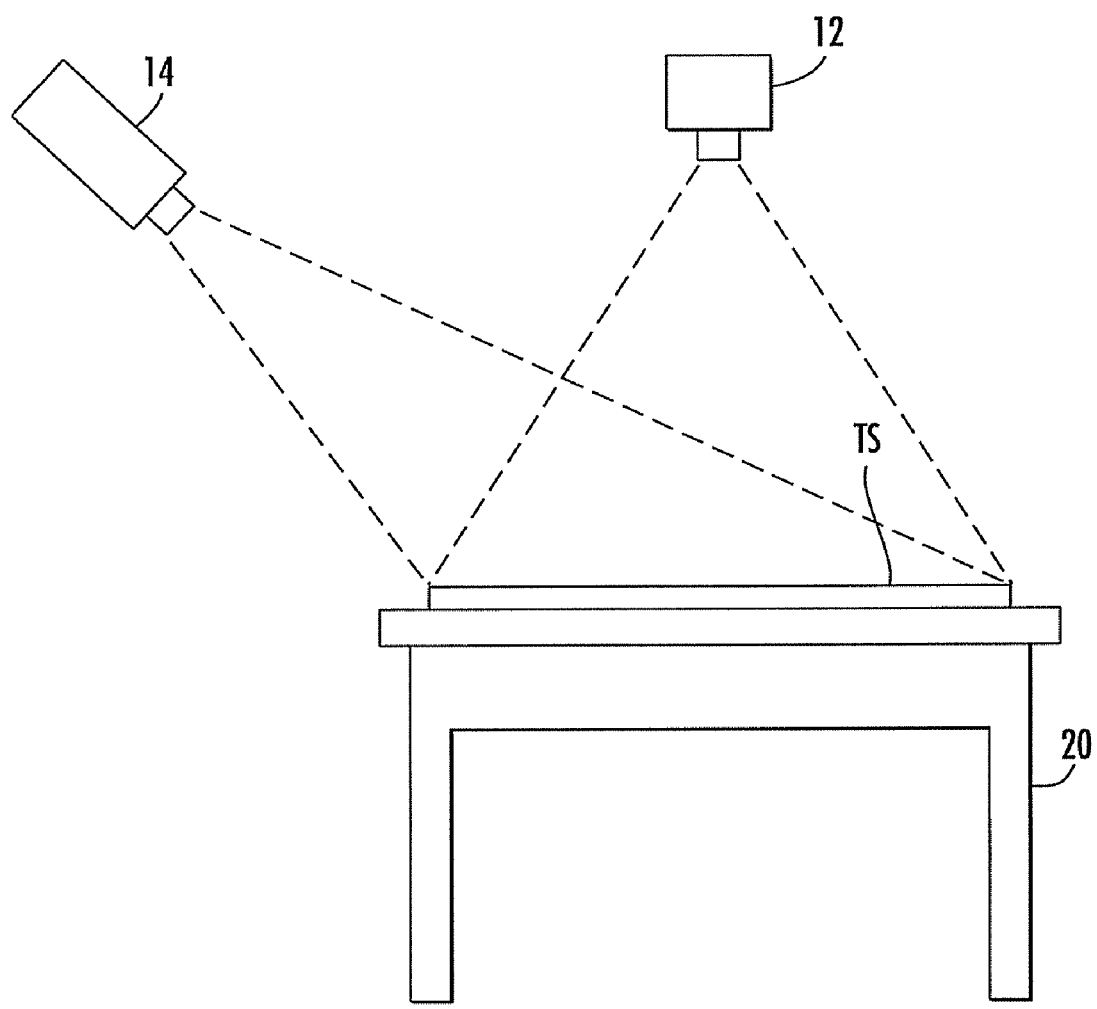
FIG. 4 illustrates a schematic view of an embodiment of a system shown in FIG. 3 with a projector of the system projecting an image.
Figure 5:
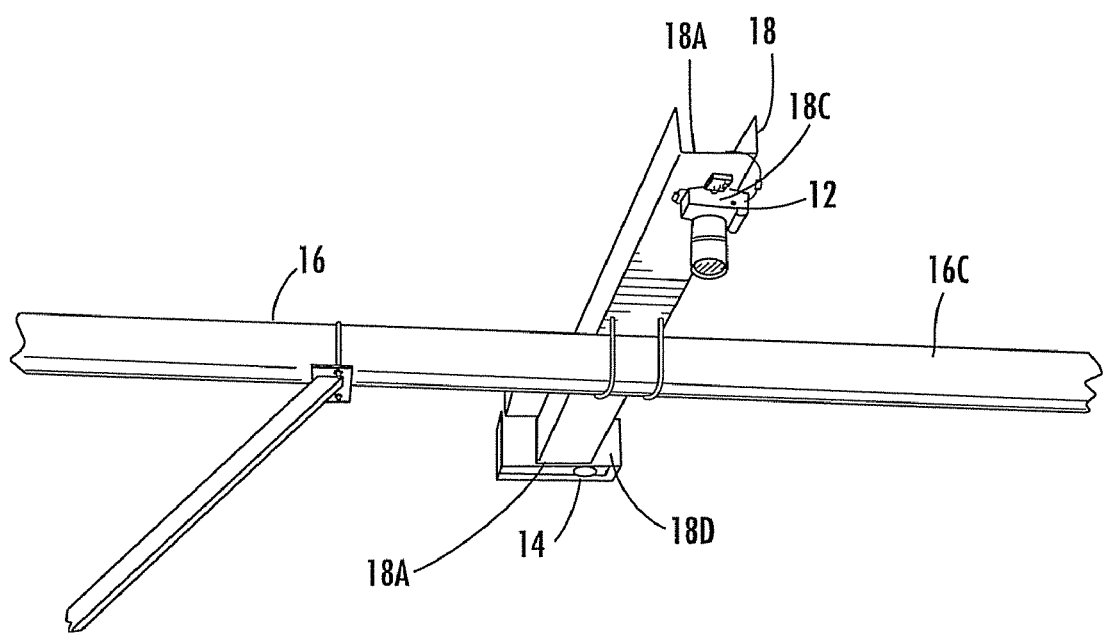
FIG. 5 illustrates a perspective view of a portion of the embodiment of the system shown in FIG. 1.
Figure 6A:
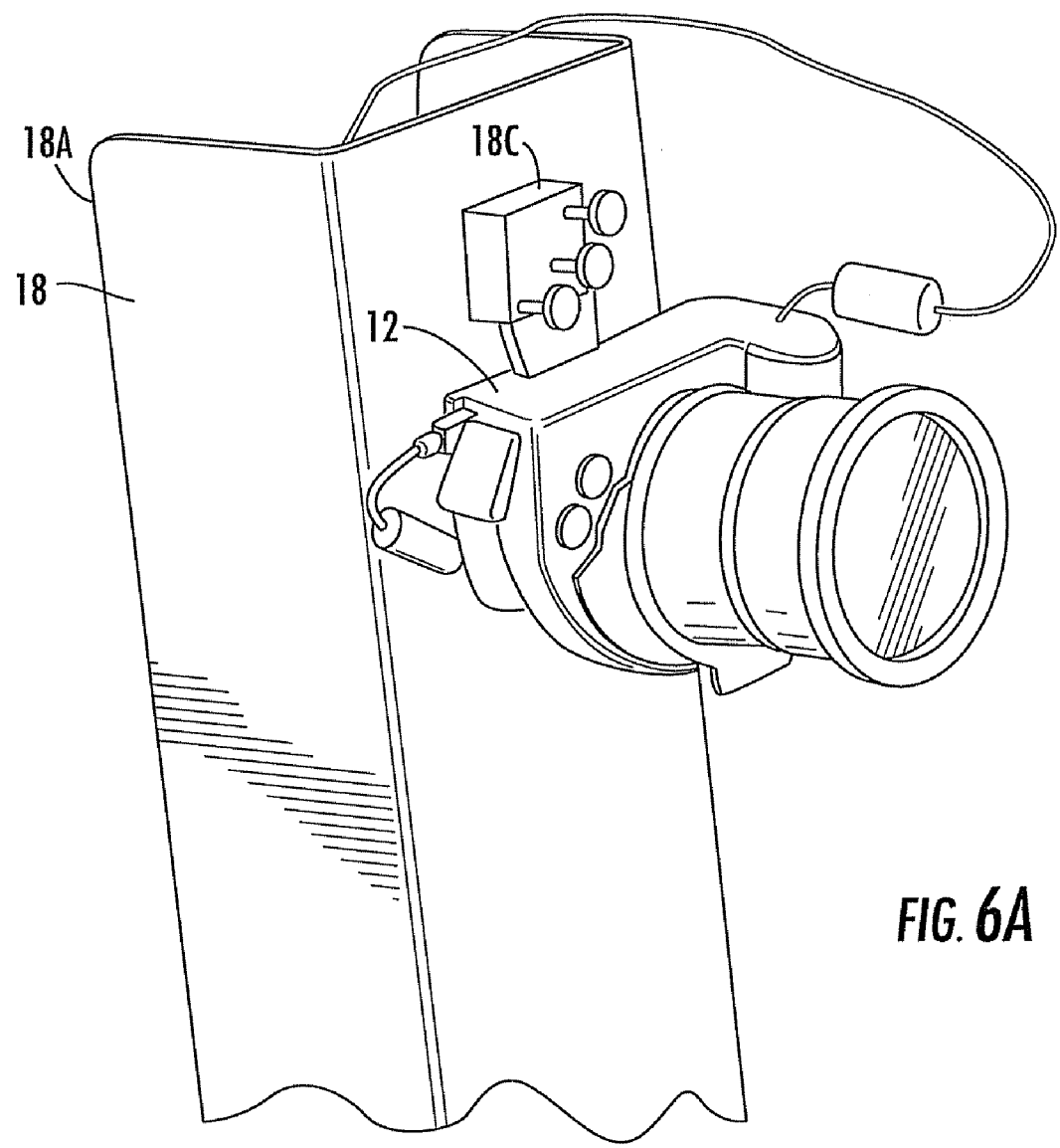
FIG. 6A illustrates a perspective view of a portion of the embodiment of the system shown in FIG. 1.
Figure 6B:
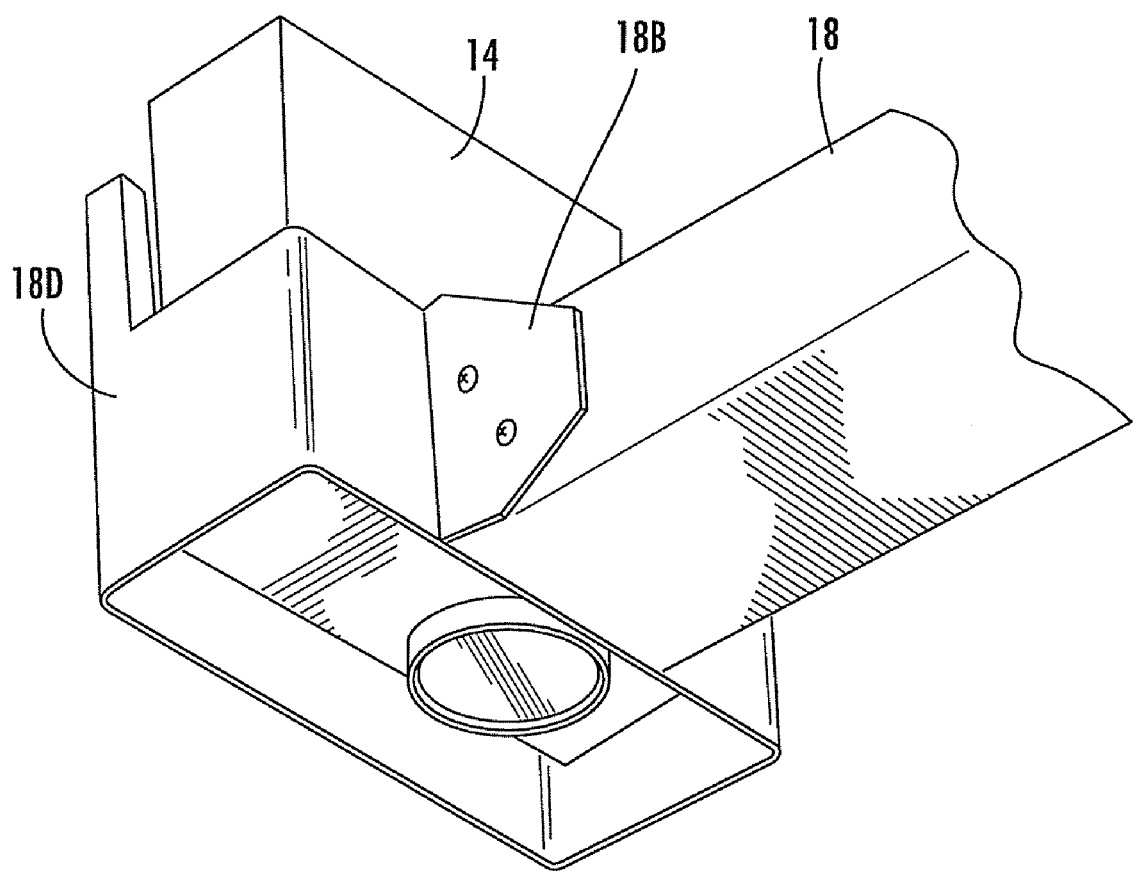
FIG. 6B illustrates a perspective view of a portion of the embodiment of the system shown in FIG. 1.

The image projector 14 is used to project an image back onto the worktable 20. The image projector 14 can be a video projector, such as a digital video projector. The image projector 14 can be positioned at a distance $D_2$ from the center of the worktable 20. The distance $D_2$ can be such that it permits the projector 14 to display an image of any animal hide that is dimensionally the same as that actual animal hide AH that is placed on the worktable. The distance $D_2$ can vary depending on the arrangement of the projector 14. As shown in FIGS. 3 and 4, for example, the projector 14 can be positioned at an angle α as measured from a central axis A of the projector to a plane PL that is parallel to a plane CL that passes through the center of the worktable. The angle α can be chosen based on the ability of the projector 14 to project a desired image size that can be corrected as will be explained below.

The projector 14 can be set in other arrangements as long as the projector has the ability to display a desired image, for example, an image that corresponds dimensionally to an object, such as an animal hide resting on the worktable 20. For example, the projector 14 can be placed at a central location above the center of the worktable 20 proximal to the camera 12 so that it projects the image downwardly about perpendicular to the center top 22 of the worktable 20. In such embodiments, a device that both captures images and projects them can be used. In other arrangements, one or more mirrors can be used to reflect the image from the projector onto the worktable 20. In such embodiments, the projector can be turned toward or away from the worktable 20. The use of mirrors can allow for the placement of the projector closer to the worktable when the system 10 is used in a place that may be confined in space. In a similar manner, one or more mirrors can be used to reflect the image from the worktable 20 to the imaging device 12 when capturing an image. Thus, the imaging device 12 can be placed in a variety of positions as well. Additionally multiple projectors may be used to improve the resolution and brightness of the projected markings. Thus, one or more projectors can be used at the same or different locations.

Both the camera 12 and the projector 14 can be secured in their desired positions relative the worktable 20 by a frame 16 as shown in FIGS. 1, 2, 5, 6A and 6B. The frame 16 can be of any structure that holds the camera 12 and the projector 14 in their desired positions relative the worktable 20 and do not interfere with the operation of the camera 12 and projector 14. Ideally, the frame 16 should provide minimal obtrusiveness to the covering "marking" and cutting operations. In the embodiment shown, the frame 16 includes vertically extending beams 16A, 16B on either side of the worktable 20. The beams 16A, 16B can be at a distance from the table 20 so that the beams 16A, 16B do not interfere with the associated work. For example, for worktables 20 that fold on two sides, the beams can be position on the non-folding sides. The beams 16A, 16B can have bases 16D that provide stability to the frame 16. The frame 16 can have a crossbar 16C that extends between the beams 16A, 16B.

The crossbar 16C can have one or more instrumentation bars 18 that are secured thereto. The instrumentation bars 18 can hold the camera 12 and the projector 14 in their desired positions in the system 10. In the embodiment shown in FIGS. 1 and 2, the instrumentation bar 18 can hold the camera 12 above the center of the worktable 20 and the projector 14 at the desired angle and distance from the center of the worktable 20. In the embodiment shown in FIGS. 1, 2, 5, 6A and 6B, the camera 12 can be located on an end 18A of the instrumentation bar 18 above the worktable 20 and the projector 14 can be located at an end 18B. The camera 12 can be held in position by a bracket 18C and the projector held in its angled position by a casing 18D. As noted above, other configurations of the frame and/or instrumentation bar are contemplated.

The camera 12 and the projector 14 can be in communication with the controller 30. The controller 30 can include a computer device 32 such as a PLC, a microcomputer, a personal computer, or the like. Further, the controller 30 can include one or more pointing devices 34, such a wired or wireless mouse, light pen, or IR pen, that can be used in electronically marking the covering, such as animal hides AH on the computer device 32 as will be explained in more detail below. The controller 30 can be used to control the operation of camera 12 and projector 14. For example, the controller 30 can be in wired or wireless communication with the camera 12 and the projector 14. The computer 32 can include software for controlling the camera 12 and projector 14, correcting the images taken by the camera 12 and the images projected by the projector 14, and for electronically marking the hides and nesting the desired templates to optimize the yield of leather from the animal hide AH as will be explained in more detail below.

To insure the accuracy of the system 10 in marking and cutting, for example, an animal hide AH, the imaging device 12 and image projector 14 can be calibrated or corrected. To accomplish this, the digital camera 12 can capture an image of a known subject that has features thereon that have known shapes, sizes, locations, scale and/or dimensions.

Figure 7:
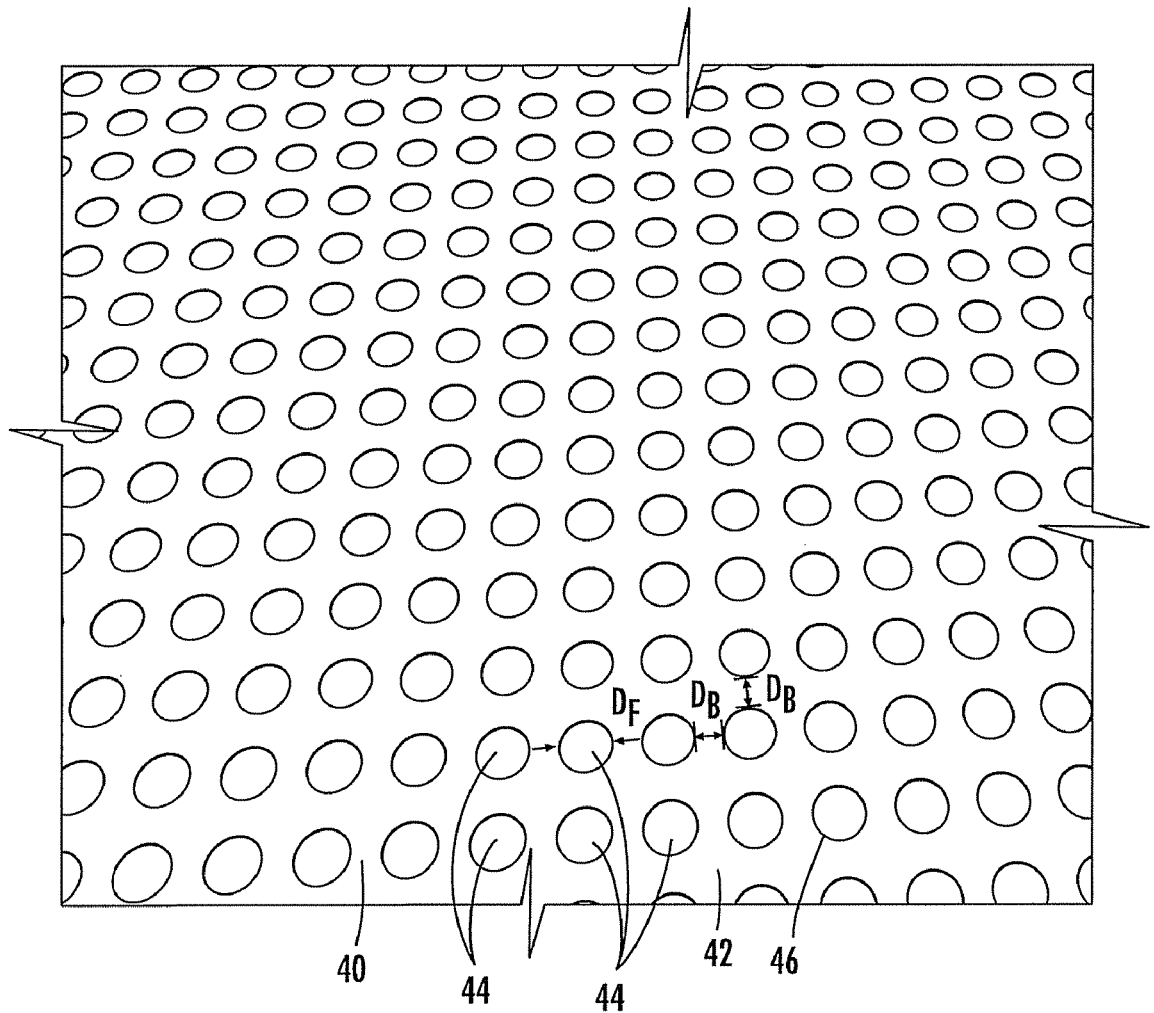
FIG. 7 illustrates a perspective view of an embodiment of a coordinate calibration chart that can be used in conjunction with a system that can be used in the processing of coverings, such as leather hides and fabrics, according to the present subject matter.
Figure 8:
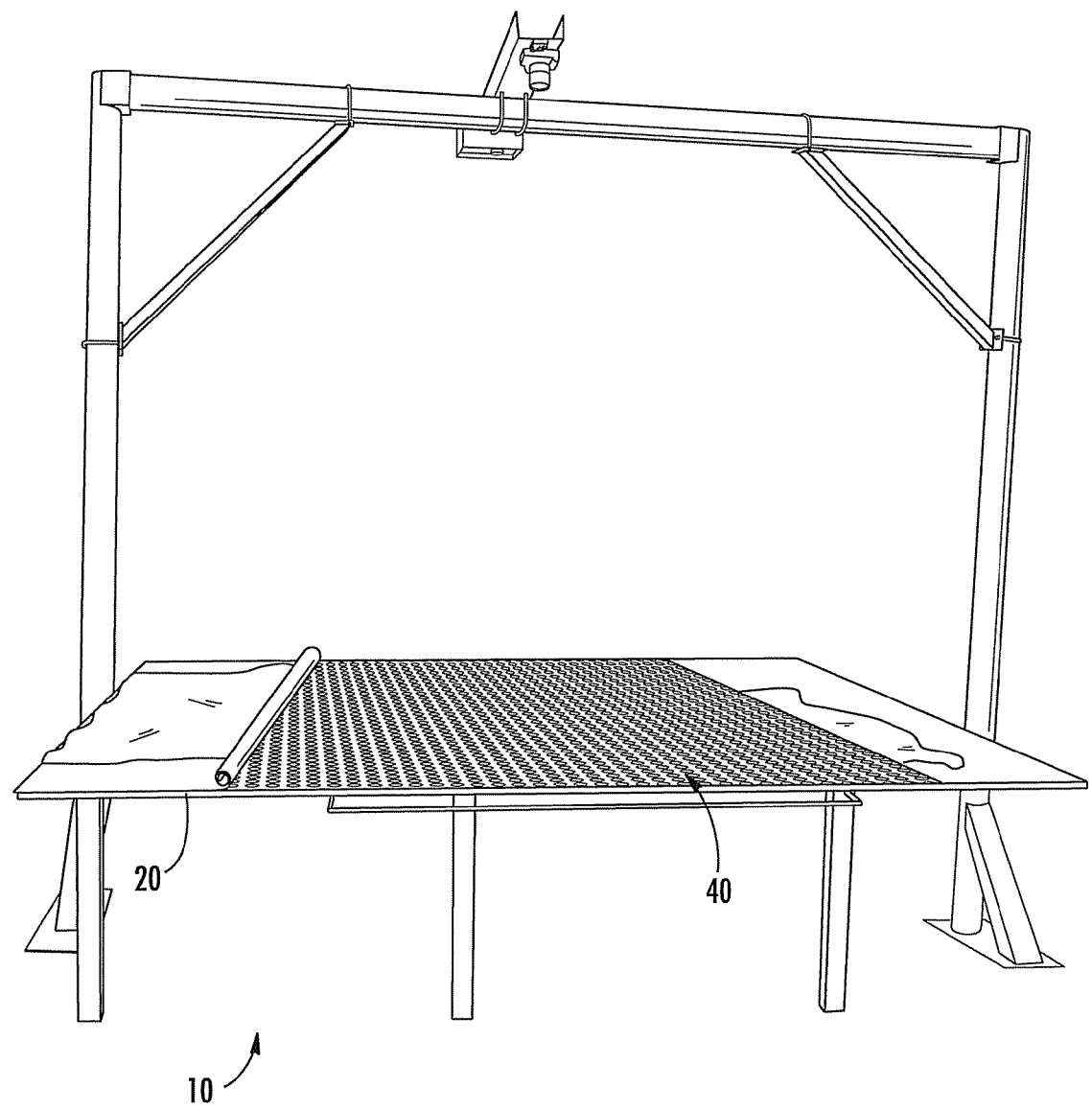
FIG. 8 illustrates a perspective view of an embodiment of the system shown in FIG. 1 in use according to the present subject matter.

For example, the known subject can be a calibration chart 40 as shown in FIG. 7 that comprises a sheet article 42 that has a pattern of features 44 thereon. The sheet article 42 can comprise paper, fabric, plastic or vinyl film, metal, wood, or the like. The features 44 on the sheet articles can have measured and known dimensions. Further, the features 44 can have measured and known distances between the features 44. The features 44 can be, for example, geometric shapes. The geometric shapes can be circles, squares, triangles, rectangles, trapezoids, nonsymmetrical shapes, or the like. As shown in FIG. 7, the geometric shapes can be circles 46. The circles 46 can have a known diameter $D_F$ with known distances $D_B$ between the circles 46. The calibration chart 40 can be spread across the worktable 20 of system 10 as shown in FIG. 8. The calibration chart 40 with its pattern of features 44 can cover the area $A_C$ that will be imaged by the camera 12 as shown in FIG. 3. For example, the calibration chart 40 with its pattern of features 44 can cover the entire area that will be imaged by the camera 12. The camera 12 can then capture the image of the work table 12. As noted above, while the calibration chart 40 is used to described the correction process, other known subjects can be used.

Using the computer 32 of the controller 30, the captured image is used to build a coordinate transformation table by comparing the dimensions of the camera image and the actual dimensions of the known subject. The camera image includes imperfections that can be caused by imperfections in the table surface, camera alignment, inherent errors in the camera 12 and the lens of the camera 12. The coordinate transformation table is then used to correct any image taken by the camera 12 by compensating for these imperfections. The computer 32 uses a program to make adjustments to the image to bring it in dimensional alignment with features 44 of the calibration chart 40.

Similarly, a projector 14 has imperfections in its alignment and inherent errors in the projector 14 and the lens of the projector 14. To correct these imperfections, the same or another known image of a known subject, such as calibration chart 40 is projected onto the table surface TS as shown in FIG. 4. The digital camera 12 then captures an image of the projected image including the projector imperfections and alignment imperfections. A second coordinate transformation table is then generated to correct the image of the projector by comparing the dimensions of the projected images based on a corrected image taken by the camera and the dimensions of the known subject. The new corrected projector image is then projected onto the table.

These corrections insure that the images taken by the camera 12 and used by the controller 30 are accurate and provide accurate dimensional information about the actual objects in the image. These corrections also insure the image projected by the projector 14 is displayed correctly onto the table. For example, the object of the corrected image projected by the projector 14 can have the same dimensions as the actual object, such as the animal hide AH, on the worktable 20.

As stated above, the system 10 can include a worktable 20, a digital camera 12, a digital video projector 14, and a controller 30 that includes one or more pointing devices 34, a computer 32, and the necessary associated software. Typical use of the system 10 would be as follows. A leather hide AH can be placed on the worktable 20 with the digital camera 12 and video projector 14 mounted overhead. This worktable 20 may have a large single surface or may be a multiple drop-leaf table, such as a double drop-leaf table that will enable the operator or operators an opportunity to look closely at or even feel the surface of the leather hide AH. If using a double drop-leaf work surface, the operator or operators start with both drop leaf sections down. The hide AH is placed on the center section 22 of the work surface. The operator or operators will then use the pointing device 34 and a video projector 14 to define the imperfections on this section of the hide AH.

Figure 9:
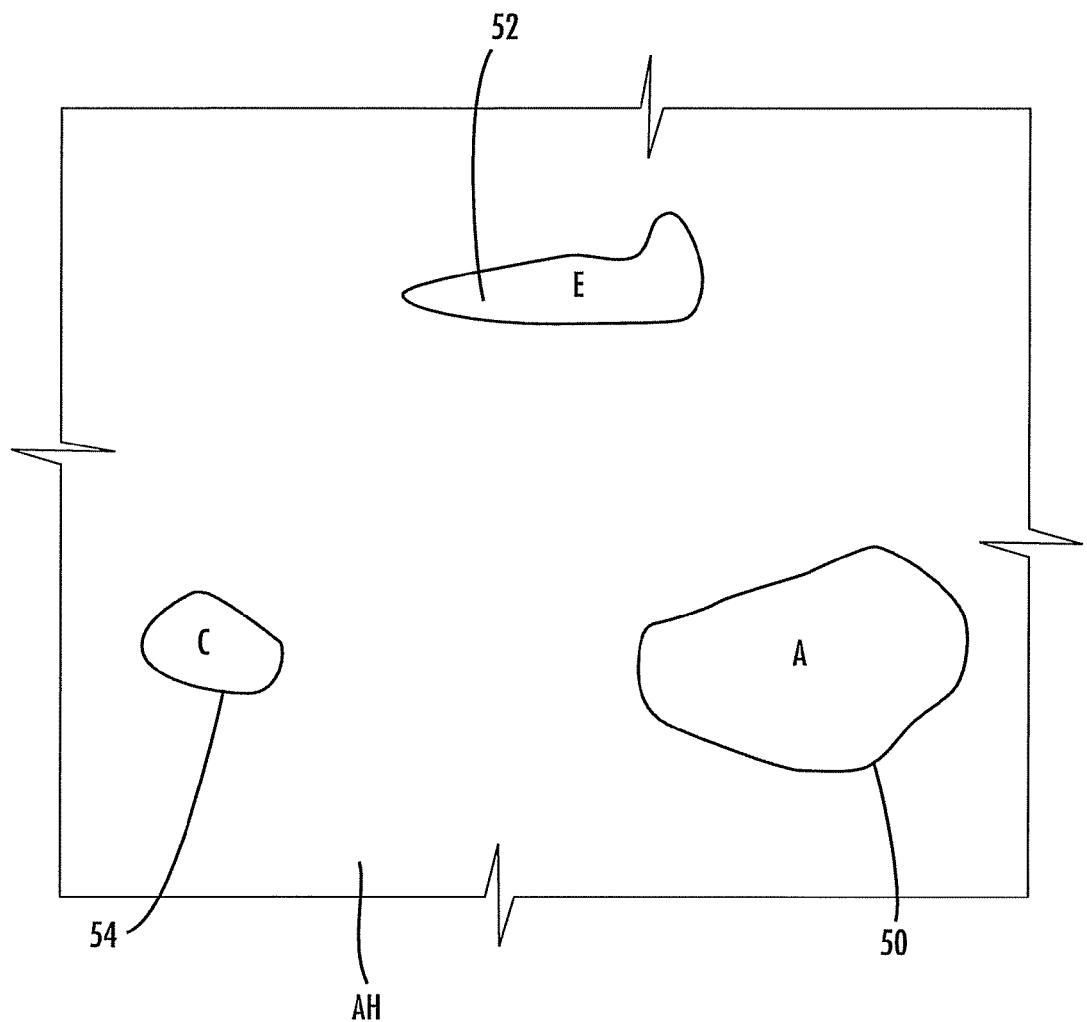
FIG. 9 illustrates a perspective view of a portion of a leather hide with virtual markings displayed thereon in an embodiment of a system that can be used in the processing of coverings, such as leather hides and fabrics, according to the present subject matter.

For example, the computer 32 can run appropriate programs that permit the pointing device 34 to act as a virtual marker. The computer projects the virtual markings drawn by the pointing device 34 through the projector taking into account the necessary corrections. Using the pointing device 34 and the projector 14, the user draws around defects on the hide AH as if drawing lines on a computer screen. The computer 32 collects the hide imperfection definition information from the pointing device 34 and displays this information by projecting an image that has been corrected using the video projector coordinate transformation table, for example, the second coordinate transformation table as referred to herein, as shown in FIG. 9. For the system to work properly, projected images must be corrected so hide imperfection definitions will be displayed accurately with respect to shape, scale, and location. The computer display menus or other inputs may be used to select the current type of imperfection being defined. By using this video projected defect map, only virtual markings, such as drawn lines 50, 52, 54, i.e., markings shown through the projected image, are placed on the leather hide surface and different types of defects can be represented by color, unique hatch marks, or other methods. For example, virtual markings 50 may designate one defect type in the hide AH, while the virtual markings 52 and the virtual markings 54 may represent different defect types.

Figure 9A:
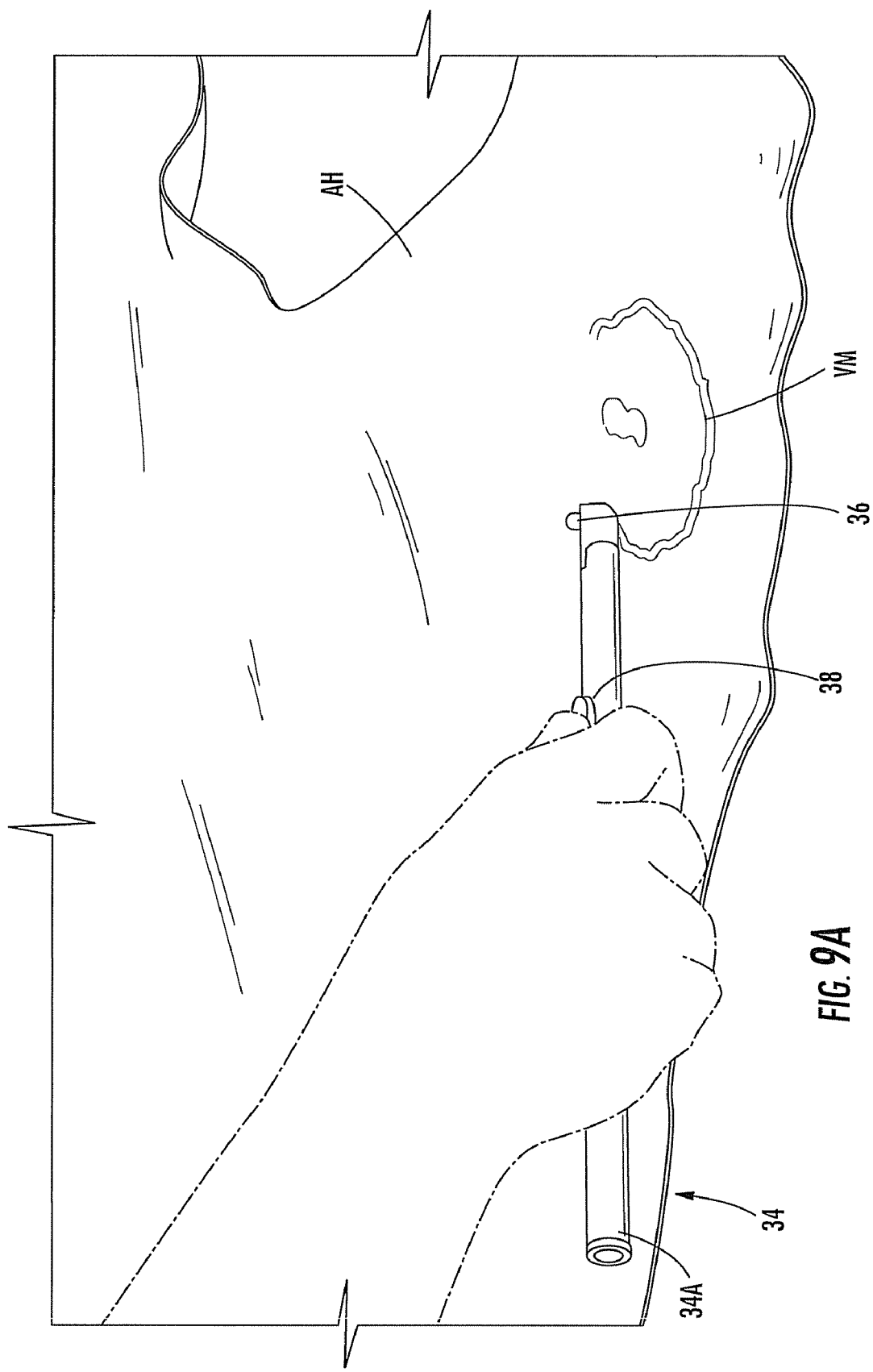
FIG. 9A illustrates a perspective view of an embodiment of a pointing device that can be used in creating virtual markings according to the present subject matter.

FIG. 9A illustrates an example of an embodiment of a pointing device 34. The pointing device 34 in FIG. 9A is a light pen 34A. The light pen 34A can comprise a light-emitting device 36, such as a light-emitting diode, that can be located, for example at a tip. However, the light-emitting device 36 can be at other locations on the light pen 34A. In particular, the light pen 34A can also include a switching mechanism, such as push button 38, that can be used to turn power on and off to the light-emitting device 36 at the tip of pen 34A. For example, the light pen 34A can be battery operated and the push button 38 can turn the light-emitting device 36 on and off.

The controller 32 shown in FIGS. 1 and 2 can be configured to track the movements of the light pen 34A (shown in FIG. 9A) in the images taken by the imaging device 12. In particular, the imaging device 12 can be, for example, a video camera that can capture multiple images as the light-emitting device 36 of the light pen 34A is turn on and emits light that is captured in the images as the light pen 34A and the light-emitting device 36 are moved around the covering such as hide AH. The controller 32 tracks the movement of the light pen 34A in the images captured by the imaging device 12 to record virtual markings VM. The virtual markings VM can be projected as an image by the projector onto the hide AH as shown in FIG. 9A. The controller 32 can be configured to correct images taken by the imaging device 12 of the location of the light pen 34A, the surface of the worktable 20 and the covering, in the form of hide AH, thereon.

The virtual markings projected on the hide are for user feedback to see where the operator or operators have marked or are marking the defects to be stored in the computer. As the user draws virtual markings on the hide, the movement of the pointing devices when engaged is stored in the computer. This information is corrected for projection of the visual virtual markings on the hide for user feedback.

Once the user has completed the definition of the portion of the hide AH on the center section 22 of the worktable 20, the drop-leafs are raised and the remaining imperfections are defined. Once all imperfections are defined, the operator can take a digital image using the camera 12. The image file can then be corrected using the camera coordinate transformation table, for example, the first coordinate transformation table as referred to herein. This corrected camera image can then be used by the software on computer 32 to collect and define boundary information, such as the edges of the hide AH as well as any holes in the hide AH. The collected boundary information along with the marked imperfections that have been identified by the operator or operators on the hide are then projected onto the table. Before projecting, the projected image is corrected using the video projector coordinate transformation table, for example, the second coordinate transformation table as referred to herein. All of the digital data containing both the boundary B and imperfection data 50, 52, 54 can be recorded in a digital file on the computer. The computer 32 and a nesting algorithm can be used to verify and record the area and the quality definition of the hide. This data can be used to compare the area and quality of the hide against the leather vendor's calculations. The boundary B and imperfection data 50, 52, 54 can either be saved for later retrieval or used immediately.

Figure 10A:
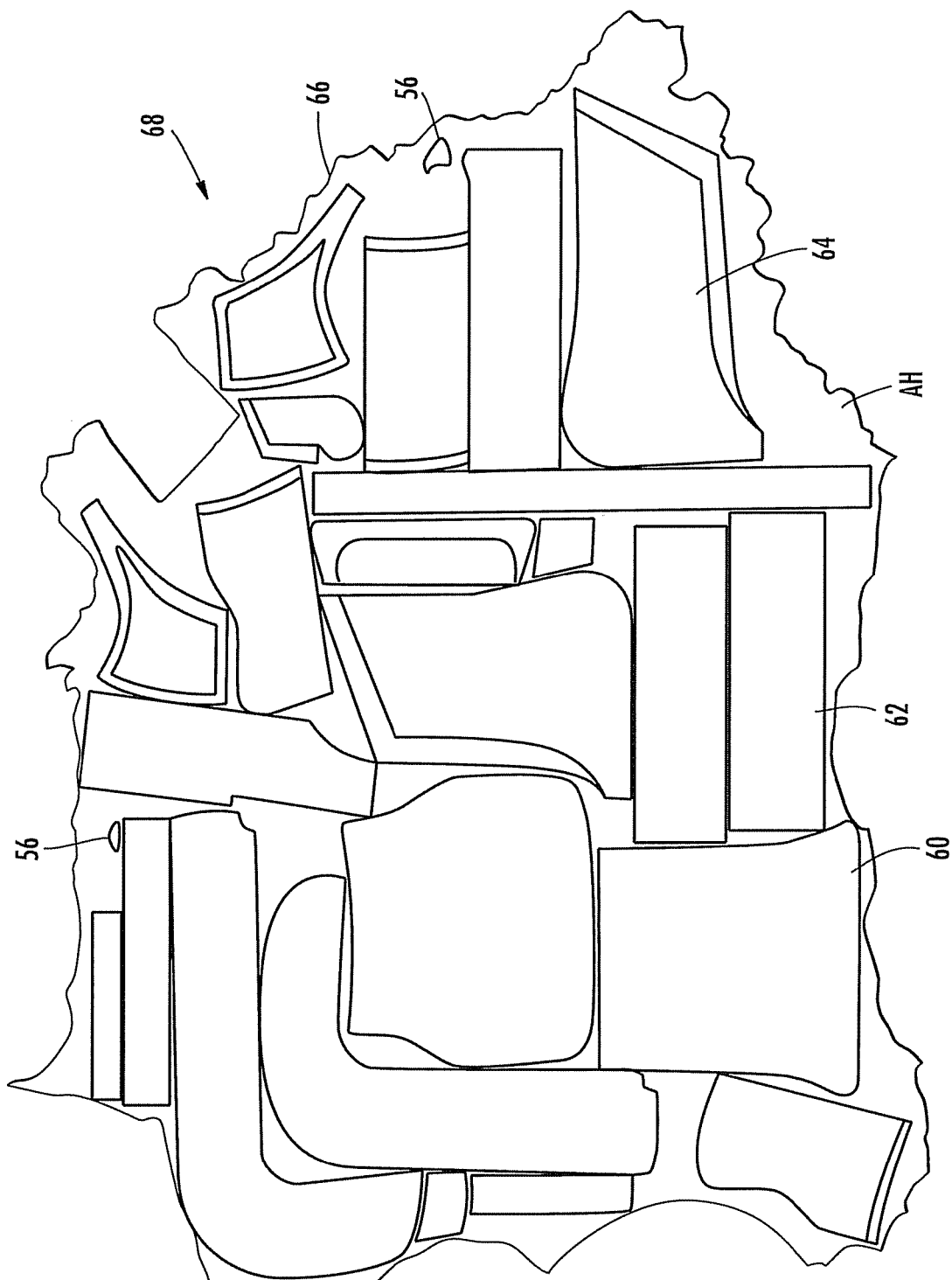
FIG. 10A illustrates a perspective view of a leather hide with virtual markings displayed thereon in an embodiment of a system that can be used in the processing of coverings, such as leather hides and fabrics, according to the present subject matter.
Figure 10B:
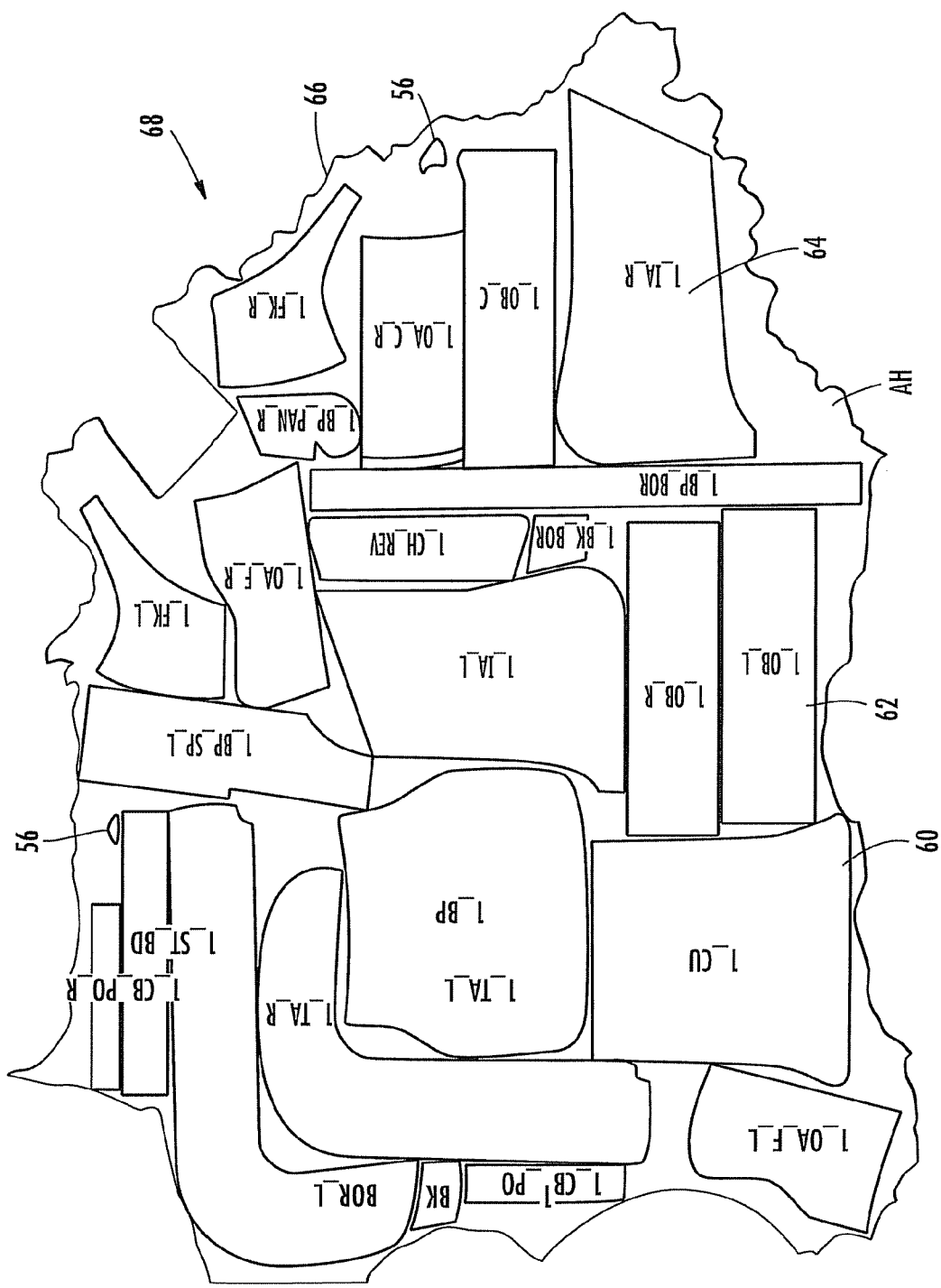
FIG. 10B illustrates a perspective view of a leather hide with virtual markings displayed thereon in an embodiment of a system that can be used in the processing of coverings, such as leather hides and fabrics, according to the present subject matter.

If used immediately, the operator can request virtual markings in the form of projected template outlines 60, 62, 64 (see FIG. 10A) stored in the computer 32 or provided to the computer 32 of the parts to be placed on the hide AH to be displayed. The operator at their discretion may place any of these projected templates 60, 62, 64 on the hide AH through the computer 32 projecting the corrected image from the projector 14 onto the hide AH. A software-nesting program run on computer 32 can then process the hide boundary, imperfections, and any number of templates. Iterations of template layouts 68 can be performed by the computer 32 until a yield threshold is met or exceeded or until a predetermined time or number of iterations is reached. After successful nesting of the templates 60, 62, 64 is complete, a corrected image containing the leather hide boundary 66, the imperfections 56, and the template outlines 60, 62, 64 can be projected onto the hide AH as shown in FIGS. 10A and 10B. FIG. 10B shows the templates 60, 62, and 64 with information identifying each template 60, 62, 64, displayed in the image to help recognize which templates 60, 62, 64 are displayed and to give the operator a chance to confirm the layout 68 of the templates with respect to the matching of the pieces of leather. Such information can be taken into account by the computer 32 and the associated software, but a user can be given the opportunity to reject the layout 68 of the templates if deemed appropriate.

In some embodiments, the system 10 can include the ability to manually nest at least a portion of the templates. This is especially useful on animal hides AH where a panel is used on the cushions or other front face portion of a piece of upholstered furniture. The same holds true for coverings such as fabrics were a print or woven pattern would be preferred on a cushion or other front face portion of a piece of upholstered furniture. The template to be placed manually can be selected by the operator with a mouse or other pointing device and positioned and rotated to the desired location on the covering such as a hide AH or fabric. Once all the templates to be placed manually are properly positioned, the computer 32 and a nesting algorithm can nest the rest of the templates around the manually placed templates to optimize yield.

Figure 11:
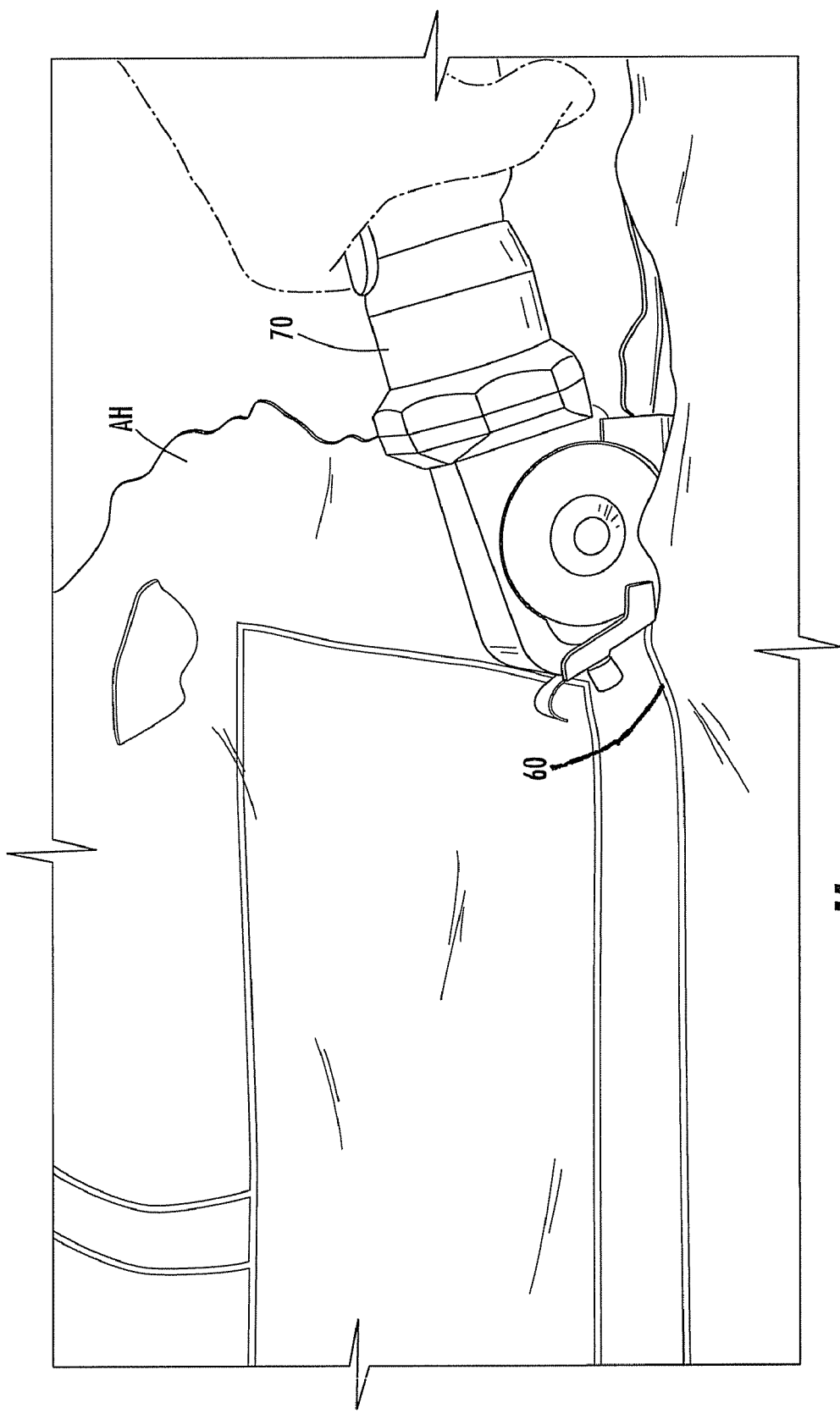
FIG. 11 illustrates a perspective view of a leather hide with virtual markings displayed thereon in an embodiment of a system that can be used in the processing of coverings, such as leather hides and fabrics, according to the present subject matter.

Once the corrected image with any projected features such as the necessary virtual markings is projected, the user can either cut the leather pieces from the hide AH with a powered or non-powered knife 70 or mark them on the hide with a pen by following the projected template outlines 60 as shown in FIG. 11.

The worktable 20 could be part of an automated cutting machine. In this case, the controller can process computerized nested image of the hide AH to drive the automated cutting machine. If the cutting machine was equipped with two worktables 20 and associated camera 12 and projector 14 for each, the operators could process a second hide while the cutting machine cuts the first hide.

Alternatively, the leather hide AH can be removed from the table and the digitized image of the leather hide with marked imperfections saved for later use. At a later time or at a different worktable or location, the digitized image of leather hide with marked imperfections could be retrieved, nested with the templates, and projected onto another similar cutting table or the cutting surface of an automated cutting machine. An automated cutting machine operator would place this pre-defect detected hide on the machine-cutting surface. A corrected digital camera 12 would then capture an image of the hide boundary and calculate the best fit against the previous nested hide boundary of the same hide. A corrected projector 14 would display a corrected image of the original hide boundary 66, all imperfections 50, 52, 54, and the templates 60, 63, 64 to be cut out of the hide on the machine-cutting surface. The operator could then massage the hide boundary to the edge of the nested hide image if necessary and start the cutting machine.

FIGS. 12-15 illustrate an embodiment of systems and methods for processing fabrics or other sheet material that have been manufactured in roll form. Since fabrics and other materials are manufactured in roll form, the same type of system can be made on a moveable mount that can travel up and down the length of a long cutting table. The system can work in a similar manner to the leather processing system 10 with one exception. Since the nested templates for fabric are rectilinear (like the fabric itself), each time the camera is moved, a different portion of the nested templates can be displayed. To accomplish this, the worktable itself can use registration marks such as binary dots so that the system can determine where the current projector position is in relation to the fabric and worktable and in turn be able to project the correct portion of the nested templates.

Figure 12:
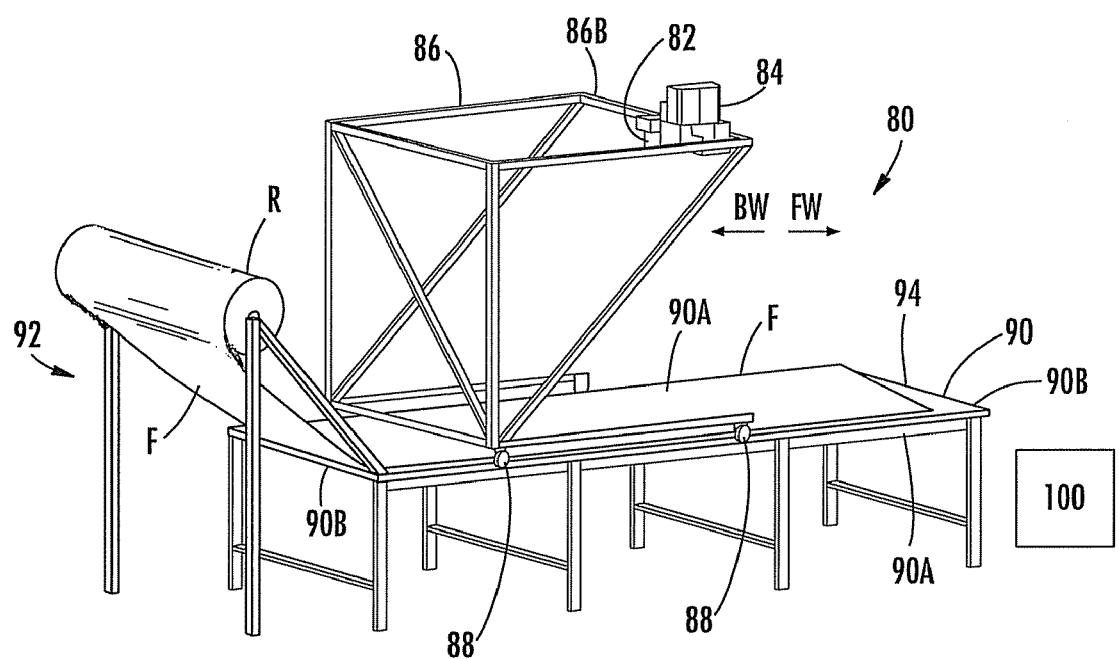
FIG. 12 illustrates a perspective view of another embodiment of a system that can be used in the processing of coverings, such as fabrics, according to the present subject matter.
Figure 13:
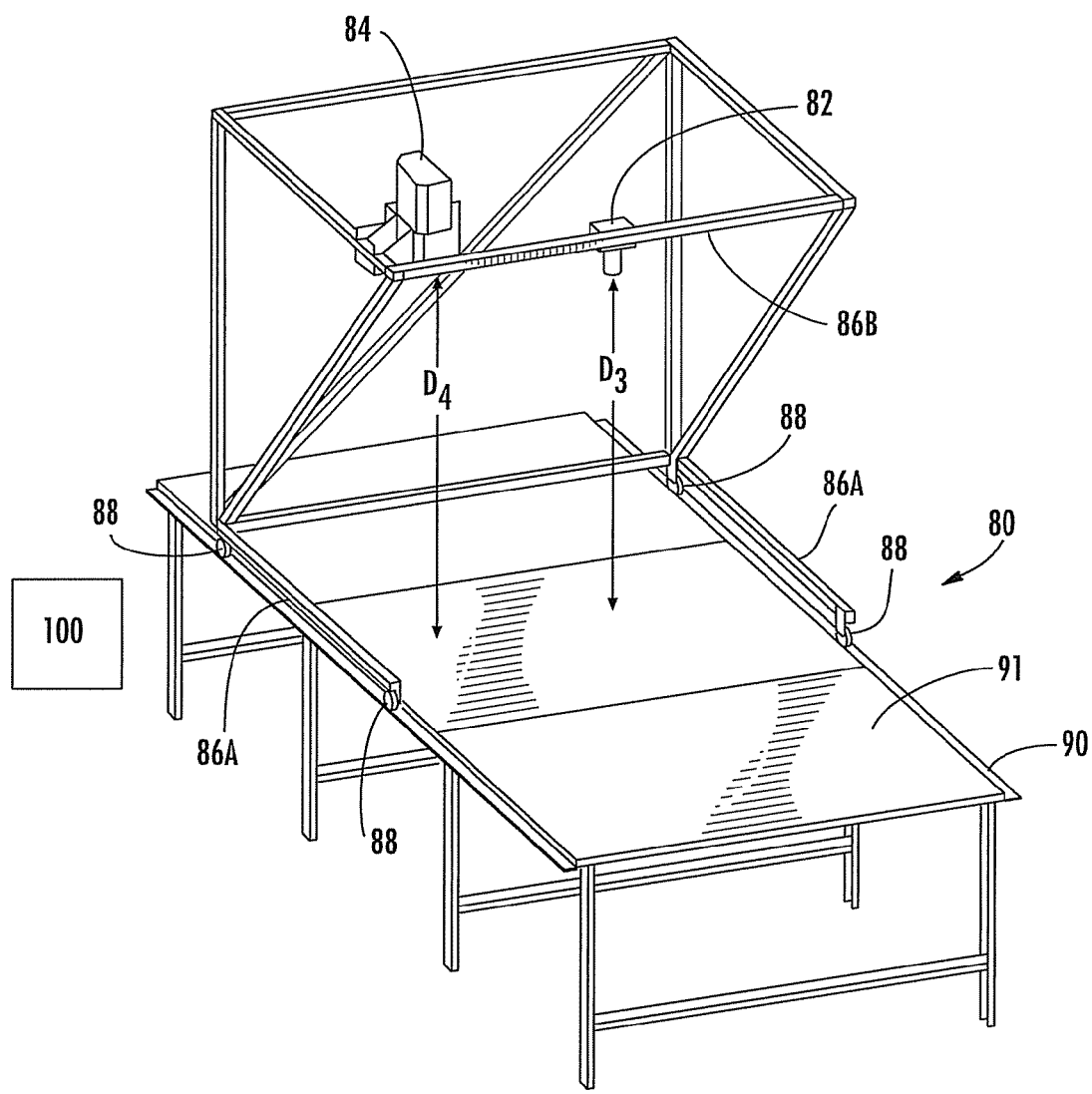
FIG. 13 illustrates a perspective view of the embodiment of the system shown in FIG. 12.

Referring to FIGS. 12 and 13, a system, generally designated 80, that employs a method for achieving improvements in covering utilization and labor costs is provided. For example, the system 80 can be used to aid in the cutting of fabric. The system 80 has similar components to the system 10 described above in reference to FIGS. 1 and 2. The system 80 can include a worktable 90, an imaging device 82, an image projector 84 and a controller 100 (shown schematically).

The work table 92 can include one or more roll mounts 92 for housing rolls R of fabrics F. The roll mounts 92 allow the fabric F to be pulled from the roll R and laid on the worktable for processing and cutting. The roll mounts 92 can be attached to the worktable 90 or can be a separate structure. The fabric f can be pulled from the roll R. Guides (not shown) can be provided under or over which the fabric F can be run to align the fabric with the top 94 of the worktable 90. Due to the rectilinear nature of the fabric being packaged in roll form, the worktable 90 can be long. For example, the worktable 90 can be longer than the worktable 20. By having a longer worktable 90, more fabric can be processed along the worktable with each laying of the fabric F.

Figure 14:
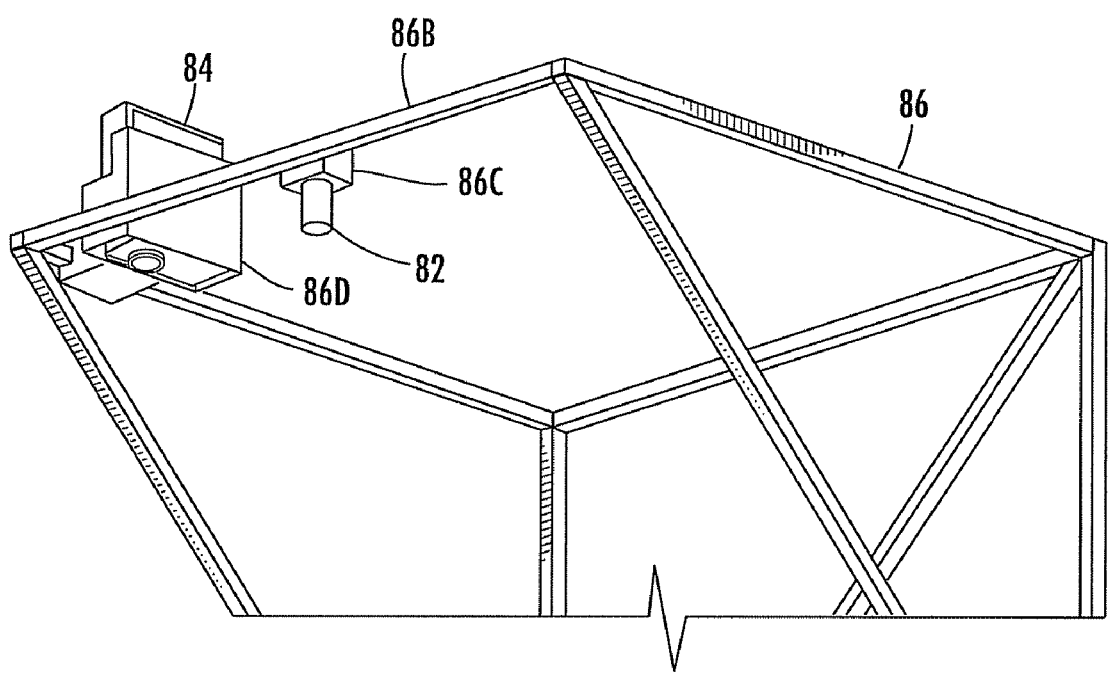
FIG. 14 illustrates a perspective view of a portion of the a rack frame of the embodiment of the system shown in FIG. 12.

A rolling rack frame 86 can be provided and mounted to the worktable 90 with the imaging device 82 and a projector 84 mounted to the rack frame 86. In this manner, both the imaging device 82 and the projector 84 can be secured in their desired height and angle positions above the worktable 90 by the rack frame 86 as shown in FIGS. 12-14. The rack frame 86 can include wheels, or rollers, 88 or some other movement mechanism thereon that allow the rack frame 86 to move up and down the worktable 90 in the directions FW and BW for processing the fabric F. The rollers 88 can run along a track (not shown) to keep that rollers 88 in position. The rack frame 86 can be any structure that can be moved along the worktable 90 and can hold the camera 82 and the projector 84 in their desired positions relative to the worktable 90 without interference with the operation of the camera 82 and projector 84. Ideally, the frame 86 should provide minimal obtrusiveness to the fabric marking and cutting operations. For example, in the embodiment shown, the rack frame 86 provides easy access over the roller bars 86A of the frame 86 to the worktable 90. The location of the imaging device 82 and projector 84 on the frame 86 can vary. In the embodiment shown in FIGS. 12-14, the camera 82 can be located at central portion of an end 86B of the rack frame 86 above the worktable 90 and the projector 84 can be located on a side portion of the end 86B. The imaging device 82 can be held in position by a bracket 86C and the projector 84 can be held in position by a casing 86D. As noted above, other configurations of the frame and/or positioning of the imaging device and projector are contemplated.

Figure 15:
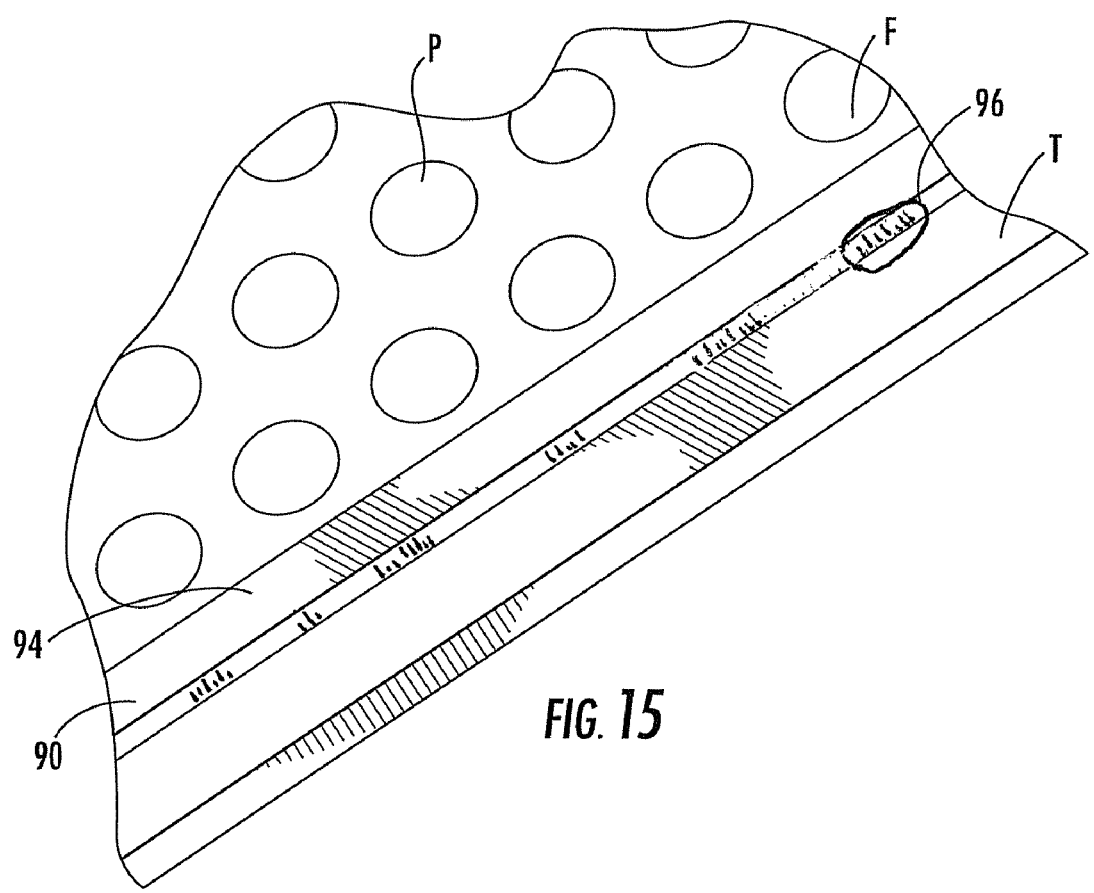
FIG. 15 illustrates a perspective view of a portion of a worktable of the embodiment of the system shown in FIG. 12 with a fabric thereon.

As stated above in order to move the rack frame 86 with the imaging device 82 and projector 84 thereon, registration marks 96, such as binary dots, can be used so that the system 80 can determine where the current projector position is in relation to the fabric and worktable and in turn be able to project the correct portion of the nested templates as shown in FIG. 15. At various points along the length of the cutting table, registration marks, or location marks, 96 can be placed on the top surface 94 of the worktable 90 for the purpose of position location by the system 80. For example, the registration marks 96 can be at a location on the worktable 90 that is between the track T on which the rollers 88 of the rack frame 86 run and the position on the top surface 94 of the worktable 90 where the fabric F resides. In this manner, the nested templates (not shown) can be virtually projected onto the fabric F, which can have a fabric pattern P thereon, and the movement of the rack frame 86 and the imaging device 82 and projector 84 can be taken into account.

When processing roll goods, such as fabrics, predetermined positions along the worktable can be used to determine where the current projector position is in relation to the fabric and worktable. For example, detents can be placed in the tracks to hold the rack frame 86 in each predetermined position. These detents can operate as registration marks. By using predetermined positions, the creation of the coordinate transformation tables for captured images and projected images for the long table can be collected in sections. For example, the camera can be moved to a predetermined position. The image taken at that position is used to create the first coordinate transformation table for that position. Additionally, the projector can be corrected at these predetermined positions by creating a second coordinate transformation table for each of these positions.

The imaging device 82 and projector 84 can be the same as the imaging device 12 and projector 14 that are used in the system 10 to process animal hides. Thus, the imaging device 82 and projector 84 will only be briefly described. The imaging device 82 is used to capture images of objects or coverings placed on the worktable 90, such as the fabrics F. The imaging device 82 can be a camera. For example, the camera can be a still-photographic or video camera. The camera can provide a digital image or can provide an image that can be digitized. For example, the imaging device 82 can be a digital camera. The imaging device 82 can be placed at a distance $D_3$ that permits the imaging device 82 to obtain the image, i.e., photograph, of a portion of the fabric F on the worktable 90 during use of the system 80. In particular, the image to be obtained by the imaging device 82 can extend from side 90A to side 90A of the worktable 90, but not necessarily from end 90B to end 90B.

The image projector 84 is used to project an image back onto the worktable 90. The image projector 84 can be a video projector, such as a digital video projector. The image projector 84 can be positioned at a distance $D_4$ from the center of the worktable 90. The distance $D_4$ can be such that it permits the projector 84 to display an image of the fabric F that is dimensionally the same as that portion of the fabric F in the image that is taken by the imaging device 82. The distance $D_4$ can vary depending on the arrangement of the projector 84. As stated above, imaging device 82 and image projector 84 can be a different position on the rack frame 86. Further, a device that both takes images and projects them can be used.

The camera 82 and the projector 84 can be in communication with the controller 100 (shown in schematic form in FIGS. 12 and 13) in the same or similar manner as described above in reference to system 10. The controller 100 can include a computer device such as a PLC, a microcomputer, a personal computer, or the like. Further, the controller 100 can include one or more pointing devices, as described above, such a wired or wireless mouse, that can be used in electronically marking the fabric F in a manner that is the same or similar to that explained above with reference to system 10. The controller 100 can be used to control the operation of camera 82 and projector 84. For example, the controller 100 can be in wired or wireless communication with the camera 82 and the projector 84. The controller 100 can include software for controlling the camera 82 and projector 84, correcting the images taken by the camera 82 and the images projected by the projector 84, and for electronically marking the fabric and nesting the desired templates to optimize the yield of the fabric in a manner similar to that explained above with reference to system 10 and as will be explained in more detail below. For example, the electronic marking can occur by using a software program on the controller 100 that uses a coordinate system to mark the boundaries of the fabric F in a corrected digital image of the fabric F and the movement of the pointing device(s) relative to those boundaries and saving that information for future use.

To insure the accuracy of the system 80 in marking and cutting, for example, a fabric F, the imaging device 82 and image projector 84 can be calibrated or corrected in that same manner as described above with respect to system 10. Therefore, the calibration and correction procedures will not be described again with reference to this embodiment.

The system 80 can be used to process fabrics F by virtually marking the fabric for cutting. The system 80 can be use as follows. After laying the fabric F out on the worktable 90, the operator can start at one end of the worktable 90 with the rolling rack frame 86 positioned so that an end of the fabric F is positioned in the active area of the system 80. After activating the system 80 for a new job, the system 80 can capture an image of the fabric F in the active area of the system 80. This image can then be processed so the position of the rolling rack frame 86 in relation to the worktable 90 is known. The system can be used on expensive matched fabrics, for example.

More expensive furniture often uses fabric that must be matched when applied. The most complicated matching is required with floral patterns. Examples of matching are (1) a stripe that starts at the lower back of a sofa and continues up the back, over the top, down the seat back, across the seat, and down the front to the bottom; (2) each cushion has a flower centered thereon; or (3) trees or animals that are larger than a single piece of fabric in the furniture and which appear to flow across two or more pieces.

Matched fabric is typically manufactured by weaving, knitting, or printing. Unfortunately, as fabric is manufactured, it must pass over many rollers. As a result of the manufacturing process, fabric typically has skew (i.e., the yarn going from one edge to the other across the fabric is not perpendicular to the length of the fabric) or bow (i.e., the yarn is not straight) or both. Moreover, with printed fabric, the fabric is typically printed with a printing cylinder or by screen printing. With either method of printing, the repeat of the pattern is not consistent. Even if the repeat was originally perfect, the fabric stretches as it is processed. Accordingly, the manufactured fabric typically differs considerably from the ideal in terms of skew, bow and repeat. The fabric may also have other defects including but not limited to dropped threads, holes, and printing defects. Because of these many defects, matched fabric cannot be stacked with any reliability of pattern match and therefore must be cut one layer at time.

The controller 100 can store a library of template patterns, each of which comprises a number of nested templates for a particular item of furniture. The proper template pattern for the fabric to be nested can be obtained and displayed on a display screen. The image of the fabric can be superimposed on the template pattern. The operator can effect movement of the displayed nested templates relative to one another and relative to the displayed image of the fabric in order to individually align the displayed templates to the displayed image of the fabric. In performing this individual alignment, the operator can pan from one section of the fabric to another and can zoom (magnify or reduce) a section of the fabric. The image device 82 can pan or zoom so that the image of the fabric moves along with the superimposed template images. The zooming or panning of the image device 82 can take place by moving the image device 82. If the image device 82 is a stationary camera, zooming and panning can take place by manipulating the stored digital image.

The system 80 provides flexible on-screen manipulation of the nested templates for the fabric on the controller 100. In particular, an individual template can be translated relative to the remaining templates and the fabric image to provide fabric match. An individual template may also be rotated relative to the other templates and the fabric. An individual template may also be skewed or bowed to take into account nonlinear variations in the fabric. Accordingly, each template may be individually nested to provide optimal alignment with the actual fabric, notwithstanding skew, bow, repeat errors, dropped threads, holes or other imperfections and defects.

The operator can define the location of any defects in the active area of the system 80 using the same virtual marking technique used on the leather hides AH in the system 10. The operator can also select with the pointing device the matchpoint of the fabric F. A fabric matchpoint is simply the exact location of the desired pattern center. This fabric matchpoint can be, for example, the center of a flower, center of a stripe, or the center of a plaid that is printed on or woven or knitted into the fabric F. After defect definition is complete for the first section of the fabric F, the rolling rack frame 86 can then be manually pushed to the next section of the fabric F and the process would be repeated. Alternatively, the rolling rack frame 86 can be motorized so that it can be moved automatically or through initiation by the operator. After the full length of the fabric F on the worktable 90 has been processed, the controller 100 will nest the templates for maximum fabric yield. This nesting will take into account the previously defined defects as well as the vertical and horizontal distance between the matchpoints.

After the nesting is complete, the templates can be projected onto the fabric F by the image projector 84 as virtual markings. The system 80 can project the portion of the nested templates necessary for any position of the rolling rack frame 86 along the length of the worktable 90. Each time the rolling rack frame 86 is moved to a different area of the worktable 90, an image is captured and processed to determine the current location of rack frame 86 in relation to the worktable 90 and only that portion of the nested templates is displayed. For each position along the worktable 90, the operator will cut along the projected template lines eliminating the need to manually mark around physical templates and thereby saving labor cost.

Thus, according to the present subject matter, systems and methods are provided for increasing yield and decreasing labor in processing coverings for consumer products. The methods and systems can utilize a pair of coordinate transformation tables, used to correct images captured by a digital imaging device and then displayed by a video projector. The methods and systems then use virtual markings to define defects and cutting lines. For example, once the covering is placed on the table of the system, the operator or operators can then use a pointing device projected by a coordinate transformation table-corrected video projector to define any imperfections on the covering using virtual markings. Nesting of templates for cutting patterns can then be performed with the cutting lines defined by virtual markings projected on the covering. Using the corrected image, the computer can place, rotate, bow and skew each template and project the results by correcting each portion of the image with a coordinate transformation table and projecting the results.

For example with an animal hide, a digital camera captures an image of the hide and corrects the image through a coordinate transformation table. The corrected image is then corrected for display using a second coordinate transformation table for the video projector. The resulting image, which includes the hide boundary, is then projected onto the leather hide. The resulting digital hide boundary and imperfection data is then combined with templates and nesting software to generate an optimized nest. This optimized nest of templates is converted into an image, which is corrected through the video projector coordinate transformation table and then projected back onto the hide as virtual markings. The operator then cuts the hide using a powered or non-powered knife following the projected template outlines. An automated cutting machine equipped with a corrected camera and projector can use this data to cut. Similar methods and systems can be used for fabrics as outlined above.

Embodiments of the present disclosure shown in the Figures and described above are exemplary of numerous embodiments that can be made within the scope of the present subject matter. It is contemplated that the configurations of the systems and methods for covering processing and cutting can comprise numerous configurations other than those specifically disclosed. The scope of the present subject matter in this disclosure should be interpreted broadly.

What is claimed is:

1. A system for processing coverings, the system comprising:
    a worktable having a surface on which a covering is placeable;
    an imaging device positionable relative to the worktable, the imaging device configured to obtain an image of the covering projected on the surface of the worktable;
    a projector positionable relative to worktable, the projector configured to project an image onto the surface of the worktable and the covering on the surface of the worktable; and
    a controller in communication with the imaging device and projector, the controller configured to correct images taken by the imaging device of the surface of the worktable and the covering and any features projected thereon and configured to correct the images projected onto the surface of the worktable and the covering thereon and the controller configured to permit the showing of virtual markings on the covering placed on the surface of the worktable through a corrected image projected thereon by the projector.

2. The system according to claim 1, wherein the controller further comprises one or more pointing devices configured to create at least some of the virtual markings that can be projected as an image from the projector onto the covering or the surface of the worktable.

3. The system according to claim 2, wherein the pointing device comprises a light pen and the controller is configured to track the movements of the light pen in the images taken by the imaging device.

4. The system according to claim 1, wherein the controller is configured to correct images taken by the imaging device of the surface of the worktable and the covering thereon so that the image taken is compensated to take into account imperfections of the image taking process to maximize the dimensional accuracy of the corrected images.

5. The system according to claim 4, wherein the controller is configured to correct images projected by the projector onto the surface of the worktable and the covering thereon so that the image projected is compensated to take into account imperfections of the image projecting process to maximize the dimensional accuracy of the corrected images.

6. The system according to claim 1, wherein the controller is configured to correct images projected by the projector onto the surface of the worktable and the covering thereon so that the image projected is compensated to take into account imperfections of the image projecting process to maximize the dimensional accuracy of the corrected images.

7. The system according to claim 1, wherein the controller is configured to correct the images from the imaging device by a process that includes taking an image of a known subject having known dimensional features by the imaging device and comparing the known dimensional features of the known subject to the dimensional features of the image to be corrected.

8. The system according to claim 7, wherein the known subject is a calibration chart.

9. The system according to claim 7, wherein the controller is configured to correct the images taken by the imaging device through the use of a first coordinate transformation table.

10. The system according to claim 1, wherein the controller is configured to correct the images projected from the projector by projecting an image of a known subject with the projector then capturing an image of the projected image with the imaging device, correcting the captured image to account for the imperfections in the imaging device, and comparing the known dimensional features of the known subject to the dimensional features of the corrected captured image of the projected image to be corrected.

11. The system according to claim 10, wherein the controller is configured to correct the images projected by the projector through the use of a second coordinate transformation table.

12. The system according to claim 1, wherein the covering being processed comprises at least one an animal hide or a fabric.

13. A system for processing fabrics, the system comprising:
   a worktable having a surface on which a fabric is placeable;
   an imaging device configured to obtain an image of at least one portion of the fabric on the surface of the worktable;
   a projector configured to project an image onto the surface of the worktable and the at least one portion of the fabric on the surface of the worktable;
   a rack frame mounted on the worktable and configured to hold the imaging device and projector relative to the surface of the worktable, the rack frame being moveable along the length of the worktable such that the imaging device and projector are movable relative to the surface of the worktable; and
   a controller in communication with the imaging device and projector, the controller configured to correct images taken by the imaging device of the surface of the worktable and the fabric thereon and configured to correct the images projected onto the surface of the worktable and the fabric thereon and the controller configured to permit the showing of virtual markings on the fabric placed on the surface of the worktable through a corrected image projected thereon by the projector.

14. The system according to claim 13, wherein the worktable includes registration marks thereon.

15. The system according to claim 13, wherein the controller further comprises one or more pointing devices configured to create at least some of the virtual markings that can be projected as an image from the projector onto the fabric or the surface of the worktable.

16. The system according to claim 15, wherein the pointing device comprises a light pen and the controller is configured to track the movements of the light pen in the images taken by the imaging device.

17. The system according to claim 13, wherein the controller is configured to correct images taken by the imaging device of the surface of the worktable and the fabric thereon so that the image taken is compensated to take into account imperfections of the image taking process to maximize the dimensional accuracy of the corrected images.

18. The system according to claim 17, wherein the controller is configured to correct images projected by the projector onto the surface of the worktable and the fabric thereon so that the image projected is compensated to take into account imperfections of the image projecting process to maximize the dimensional accuracy of the corrected images.

19. The system according to claim 13, wherein the controller is configured to correct the images from the imaging device by a process that includes taking an image of a known subject having known dimensional features by the imaging device and comparing the known dimensional features of the known subject to the dimensional features of the image to be corrected.

20. The system according to claim 19, wherein the controller is configured to correct the images taken by the imaging device through the use of a first coordinate transformation table.

21. The system according to claim 13, wherein the controller is configured to correct the images projected from the projector by projecting an image of a known subject with the projector then capturing an image of the projected image with the imaging device, correcting the captured image to account for the imperfections in the imaging device, and comparing the known dimensional features of the known subject to the dimensional features of the corrected captured image of the projected image to be corrected.

22. The system according to claim 21, wherein the controller is configured to correct the images projected by the projector through the use of a second coordinate transformation table.

23. A method for processing coverings comprising:
   providing a first coordinate transformation table for correcting an image captured by an imaging device and a second coordinate transformation table for correcting an image to be projected by a projector;
   placing a covering on a worktable;
   projecting a corrected captured image from the controller by a projector onto the covering;
   correcting the corrected captured image projected by the projector using a second coordinate transformation table so that the corrected image that is projected is dimensionally accurate; and
   providing virtual markings through the controller that are includable in the image projected on the covering by the projector.

24. The method according to claim 23, further comprising creating the first coordinate transformation table by taking an image of a known subject having known dimensional features by the imaging device and comparing the known dimensional features of the known subject to the dimensional features of the image to be corrected.

25. The method according to claim 23, further comprising creating the second coordinate transformation table by projecting an image of a known subject having known dimensional features onto the surface of the worktable with the projector, then capturing an image of the projected image with the imaging device, correcting the captured image to account for the imperfections in the imaging device, and comparing the known dimensional features of the known subject to the dimensional features of the corrected captured image of the projected image to be corrected.

26. The method according to claim 23, wherein the virtual markings comprise lines used to define imperfections in the covering.

27. The method according to claim 26, wherein the virtual markings further comprise templates that are used to mark and/or cut the covering into panels.

28. The method according to claim 27, further comprising nesting the templates taking into consideration the defined imperfections using the controller to optimize yield of the covering.

29. The method according to claim 28, further comprising at least one of marking or cutting the covering based on the nested templates.

30. The method according to claim 23, wherein the virtual markings comprise boundary lines that outline the boundaries of the covering.

31. The method according to claim 23, further comprising capturing an image of the covering on the worktable using the imaging device.

32. The method according to claim 31, further comprising correcting the captured image using a second coordinate transformation table so that the corrected captured image is dimensionally accurate.

33. A method for processing fabrics comprising:
   providing a first coordinate transformation table for correcting an image taken by a digital imaging device and a second coordinate transformation table for correcting an image to be projected by a projector;
   placing a fabric on a worktable;
   positioning the digital imaging device and projector relative to a portion of the fabric and the worktable;
   capturing an image of the portion of the fabric and the worktable and processing registration marks on the worktable;
   correcting the captured image using the first coordinate transformation table to be dimensionally accurate;
   projecting a corrected captured image from the controller by a projector onto the fabric;
   correcting the corrected captured image projected by the projector using the second coordinate transformation table to be dimensionally accurate; and
   providing virtual markings through the controller that are includable in the image projected on the portion of the fabric by the projector.

34. The method according to claim 33, further comprising creating the first coordinate transformation table by taking an image of a known subject having known dimensional features by the imaging device and comparing the known dimensional features of the known subject to the dimensional features of the image to be corrected.

35. The method according to claim 33, further comprising creating the second coordinate transformation table by projecting an image of a known subject having known dimensional features onto the surface of the worktable with the projector, then capturing an image of the projected image with the imaging device, correcting the captured image to account for the imperfections in the imaging device, and comparing the known dimensional features of the known subject to the dimensional features of the corrected captured image of the projected image to be corrected.

36. The method according to claim 33, wherein the virtual markings comprise lines used to define imperfections in the portion of the fabric.

37. The method according to claim 36, wherein the virtual markings further comprise templates that are used to cut the portion of the fabric into panels.

38. The method according to claim 37, further comprising nesting the templates taking into consideration the defined imperfections using the controller to optimize yield of the fabric.

39. The method according to claim 38, further comprising cutting the fabric based on the nested templates.

40. The method according to claim 33, further comprising moving the imaging device and projector to another position relative to a new portion of the fabric and the worktable.

41. The method according to claim 40, further comprising taking an image of the new portion of the fabric and the worktable and processing registration marks on the worktable.

\* \* \* \* \*